United States Patent [19]

Kagemoto

[11] Patent Number: 5,623,493
[45] Date of Patent: Apr. 22, 1997

[54] MULTIPLEXER DEMULTIPLEXER SWITCHING DEVICE AND NETWORK ADAPTER

[75] Inventor: Tetsuya Kagemoto, Itami, Japan

[73] Assignee: Mitsubishi Denki Kabushiki Kaisha, Tokyo, Japan

[21] Appl. No.: 416,213

[22] Filed: Apr. 4, 1995

[30] Foreign Application Priority Data

Apr. 21, 1994 [JP] Japan .................................. 6-083363

[51] Int. Cl.$^6$ ................................................. H04L 12/56
[52] U.S. Cl. ........................... 370/397; 370/420; 370/535
[58] Field of Search ........................... 370/60, 60.1, 94.1, 370/94.2

[56] References Cited

U.S. PATENT DOCUMENTS

| | | | |
|---|---|---|---|
| 5,390,175 | 2/1995 | Hiller et al. | 370/60 |
| 5,509,007 | 4/1996 | Takashima et al. | 370/60.1 |
| 5,513,178 | 4/1996 | Tanaka | 370/60.1 |

Primary Examiner—Melvin Marcelo
Attorney, Agent, or Firm—Oblon, Spivak, McClelland, Maier & Neustadt, P.C.

[57] ABSTRACT

When cells inputted from an incoming line (30) are demultiplexed cells for transmitting voice signals, a demultiplexer (31) extracts the signals from the cells and distributes the same to lines ($33_1$ to $33_n$) corresponding to virtual channel identifiers of the cells, while distributing other cells to a line ($33_0$) as such in other case. A multiplexed cell generator (35) reads a plurality of signals passing through FIFOs ($34_1$ to $34_n$) in a cycle of 125 μsec., and stores the same in an information field of a multiplexed cell. A demultiplexer (39) preferentially outputs the cell of the line ($33_0$) to an outgoing line (310), while inserting a multiplexed cell passing through an FIFO (38) in a vacant cell caused in the line ($33_0$) and outputting the same to the outgoing line (310). Thus, voice signals of a plurality of virtual channels are multiplexed in a transmission path on the outgoing line side, whereby waste of the band is reduced. It is possible to effectively use bands of a network in transmission of voice signals.

18 Claims, 18 Drawing Sheets

420 NETWORK

400 ATM NETWORK

MULTIPLEXER DEMULTIPLEXER SWITCHING DEVICE AND NETWORK ADAPTER

BACKGROUND OF THE INVENTION

1. Field of the Invention

The present invention relates to a switching device and a network adapter for efficiently transmitting voice-band signals on an ATM network, and a multiplexer and a demultiplexer forming principal parts thereof.

2. Background of the Invention

<Background of ATM>

ISDN (integrated service digital network) is a communication network for integratedly providing various communication services such as voice communication and data communication through generic user-network interfaces. This ISDN is now developing to B-ISDN (broadband aspects of ISDN) aimed at providing high-speed communication services such as a visual telephone, a picturephone meeting and a cable television and simultaneously and efficiently providing a number of services which are varied with media. An ATM (asynchronous transfer mode) is a key technique supporting the B-ISDN. A network generally employing the ATM technique including the B-ISDN is generally called an ATM network.

In the ATM, blocks (called "ATM cells" or "cells") which are provided with header parts storing labels are transmitted in response to occurrence of information, similarly to a packet mode in ISDN which is precedent to the B-ISDN, i.e., N-ISDN (narrowband aspects of ISDN). Thus, it is possible to cope with arbitrary communication speeds including variable speed communication (service system transmitting burstly generated information at its original variable speed).

In the ATM, further, the cells are at a fixed length, dissimilarly to the packet mode. Therefore, the communication can be made with no inhibition of speed increase by positional detection for the header parts. Further, all data are stored in cells of the same shapes and subjected to processing such as exchange regardless of communication media such as voices, images and data, whereby it is possible to transmit various types of data in a single network in a one-way manner regardless of differences between the media.

In addition, protocols are simplified in the ATM with the background of quality improvement in the transmission media, while the same can be processed in a hardware manner with no software. Namely, the ATM is a technique which is mainly adapted to solve the problem of difficulty in coping with speed increase in the packet mode.

<Principle of ATM>

As hereinabove described, all data are carried on cells in the ATM. FIG. 16 is a structural diagram showing the structure of a cell 13. The data length of the cell 13 is fixed at 53 octets (1 octet=8 bits). The cell 13 is formed by a header part (cell header) 14 of 5 head octets and an information field part (also referred to as a "payload") 10 of 48 octets. The header part 14 stores an identifier indicating the destination, so that the cell 13 is transmitted to the destination through the identifier. Information such as a voice, an image and data is stored in the information field part 10.

FIG. 17 is a block diagram showing an exemplary structure of paths for transmitting cells each having the aforementioned structure, i.e., an ATM network. As shown in FIG. 17, two types of hierarchical information transmission paths (connections) including virtual channels (VC) 23a to 23d and virtual paths (VP) 24a to 24c and 25a to 25h are logically defined in the ATM network. The VCs 23a to 23d are connections forming the basis of ATM services, and a series of cells storing information such as voices and data of subscribers 21a to 21h are identified as those belonging to a single VC. In general, each VC is set between a pair of subscribers, as illustrated in FIG. 17.

The ATM network identifies the VC for a certain cell through a VCI (virtual channel identifier) which is stored in each header part. The values of such VCIs may be reloaded by ATM switching nodes (relay points) 22a to 22c. When a VC is set, a relevant switching node holds a conversion table of the VCI, so that connection is theoretically maintained between end subscribers. In such VC connections, respective segments which are delimited by the switching nodes are called VC links. Therefore, a single VCI value can be regarded as being supplied to a single VC link.

On the other hand, the VPs, each of which is formed by bundling a plurality of VCs, are generally set between the subscribers and the switching nodes (VCPs 25a to 25h in FIG. 17) or pairs of switching nodes (VPs 24a to 24c in FIG. 17). The ATM network identifies a VP for a certain cell through a VPI (virtual path identifier) which is stored in each header part. The values of such VPIs are released by the ATM switching nodes. Namely, the ATM switching nodes are nodes between the VC links, as well as terminating ends of the VP connections.

As to a system of transmitting voice-band signals through the ATM network, currently defined is a method of transmitting a 1 octet voice signal every 125 μsec. with a 1 octet control signal, while storing the same in an information field part of a single cell. FIG. 18 typically shows the principle of this method. Voice signals 12 which are inputted in the unit of 1 octet every 125 μsec. are stored in cells 13 by a cellularizing unit 11, and transmitted every 125 μsec. These cells 13 are transmitted through the ATM network, as hereinabove described.

Each cell 13 stores a 1 octet control signal 15 and a 1 octet voice signal 12 in its information field part 10. In the information field part 10 of 48 octets, therefore, only 2 octets are used with no employment of the remaining 46 octets. Namely, the network bands are disadvantageously used in vain in transmission of voice signals through the ATM network.

In order to solve this problem, it may be possible to store the voice signals of the cells 13 belonging to a single VC by the information field length for simultaneously storing the same in a single cell. However, storage of the voice signals is accompanied with corresponding transmission delay. When 47 octet voice signals and 1 octet control data are stored in a single cell, for example, the delay reaches 5.875 msec. An efficient real-time operation is required for the voice signal transmission service, and the delay caused by this method results in unneglectable reduction in transmission quality.

SUMMARY OF THE INVENTION

According to a first aspect of the present invention, a multiplexer in an asynchronous transfer mode network for multiplexing a plurality of demultiplexed virtual channels transmitting voice signals to a multiplexed virtual channel comprises (a) a table capable of registering correspondences between virtual channel identifiers of the plurality of demultiplexed virtual channels transmitting voice signals among virtual channels which are set on an incoming line and positions in an information field of a multiplexed cell belonging to the multiplexed virtual channel among virtual channels which are set on an outgoing line, and (b) cell multiplexing means for receiving demultiplexed cells which are inputted from the incoming line and storing signals which are stored in information fields of the demultiplexed cells belonging to the plurality of demultiplexed virtual channels in prescribed positions of the information field of the multiplexed cell for transmitting the multiplexed cell to the outgoing line.

In the multiplexer according to the first aspect of the present invention, the signals in the information fields of the demultiplexed cells belonging to the plurality of demultiplexed virtual channels transmitting voice signals are stored in the information field of the multiplexed virtual channel. Therefore, it is possible to save the band in the transmission path setting the multiplexed virtual channel while suppressing delay fluctuation.

Preferably, the cell multiplexing means comprises (b-1) a first line, (b-2) a plurality of second lines, and (b-3) a third line, and the table is capable of further registering correspondences between the virtual channel identifiers of the plurality of demultiplexed virtual channels transmitting voice signals and the second lines. Preferably, the cell multiplexing means further comprises (b-4) distribution means receiving cells from the incoming line and comparing virtual channel identifiers of the cells with registered contents in the table for transmitting the cells to the first line when the cells belong to none of the multiplexed virtual channels transmitting voice signals while distributing signals which are stored in the information fields of the demultiplexed cells to any ones of the second lines on the basis of the correspondences which are registered in the table when the cells are demultiplexed cells belonging to the demultiplexed virtual channels transmitting voice signals, (b-5) multiplexed cell generation means for storing the signals which are distributed to the plurality of second lines in prescribed positions in the information field of the multiplexed cell on the basis of the correspondences which are registered in the table and transmitting the multiplexed cell to the third line, and (b-6) integration means for transmitting the cells which are transmitted to the first line and the multiplexed cell which are transmitted to the third line to the outgoing line.

In the multiplexer according to the first aspect of the present invention, the cells transmitted from the incoming line are sorted to those belonging to the plurality of demultiplexed channels transmitting voice signals and other cells, to be handled. Namely, multiplexing is carried out on the cells belonging to the plurality of demultiplexed channels transmitting voice signals, while no multiplexing is carried out on the remaining cells. Every one of the multiplexed and demultiplexed cells is outputted to the outgoing line by the integration means. According to this multiplexer, therefore, the cells transmitted from the incoming line are not restricted to those belonging to the plurality of demultiplexed channels transmitting voice signals to be multiplexed.

Preferably, the cell multiplexing means further comprises (b-7) FIFO type memory means which is interposed in each of the plurality of second lines, and the multiplexed cell generation means successively reads the signals which are stored in the FIFO type memory means every constant period.

The multiplexer according to the first aspect of the present invention comprises the FIFO type memory means interposed in the second line while the signals are periodically read from the respective FIFO type memory means, whereby delay fluctuation of cells inputted from the incoming line is absorbed.

Preferably, a display field is provided in a prescribed position of the information field of the multiplexed cell, and the multiplexed cell generation means further comprises (b-6-1) means for storing a signal expressing the fact of occurrence of an overflow or an underrun in the FIFO memory means, and a signal specifying one of the second lines causes the fact in the display field.

In the multiplexer according to the first aspect of the present invention, information on an overflow or an underrun in the FIFO type memory means is transmitted while being carried on the multiplexed cell. Therefore, it is possible to efficiently process the multiplexed cell in a demultiplexer, for example, on the basis of this information.

Preferably, the cell multiplexing means further comprises (b-8) FIFO type memory means which is interposed in the third line, and the integration means transmits the cells which are transmitted on the first line to the outgoing line, while reading the multiplexed cell which is stored in the FIFO type memory means in coincidence with timing causing a vacant cell in the first line as well as inserting the multiplexed cell in the vacant cell and transmitting the same to the outgoing line.

The multiplexer according to the first aspect of the present invention preferentially transmits the cells on the first line to the outgoing line as compared with the multiplexed cell on the third line by the integration means. Further, the FIFO memory means is interposed in the third line, thereby enabling adjustment of the time for transmitting the multiplexed cell. Thus, it is possible to suppress enlargement of delay times in cells which are not objects of multiplexing.

Preferably, the multiplexer further comprises (b-9) FIFO type memory means which is interposed in the first line, and the integration means transmits the multiplexed cell which is transmitted on the third line to the outgoing line, while reading the cell which is stored in the FIFO type memory means in coincidence with timing causing a vacant cell in the third line as well as inserting the multiplexed cell in the vacant cell and transmitting the same to the outgoing line.

The multiplexer according to the first aspect of the present invention preferentially transmits the multiplexed cell on the third line to the outgoing line as compared with the cells on the first line by the integration means. Further, the FIFO memory means is interposed in the first line, thereby enabling adjustment of the time for transmitting the cells on the first line. Thus, it is possible to suppress enlargement of delay times in cells which are objects of multiplexing.

According to a second aspect of the present invention, a demultiplexer in an asynchronous transfer mode network for demultiplexing a multiplexed virtual channel transmitting voice signals to a plurality of demultiplexed virtual channels comprises (a) a table capable of registering correspondences between virtual channel identifiers of the plurality of demultiplexed virtual channels transmitting voice signals which are set on an outgoing line and positions in an information field of a multiplexed cell belonging to the multiplexed virtual channel transmitting voice signals among virtual channels which are set on an incoming line, and (b) cell demultiplexing means for receiving the multiplexed cell which is inputted from the incoming line and distributing signals in an information field of the received multiplexed cell to information fields of the plurality of demultiplexed virtual channels on the basis of the correspondences which are registered in the table for transmitting the plurality of demultiplexed cells to the outgoing line.

In the demultiplexer according to the second aspect of the present invention, the signal in the information field of the multiplexed virtual channel transmitting voice signals is distributed into the information fields of the demultiplexed cells belonging to the plurality of demultiplexed virtual channels. Thus, the multiplexed voice signal returns to the original state. Therefore, it is possible to carry out multiplexing in the transmission path by providing the demultiplexer and a multiplexer on both ends thereof.

Preferably, the cell demultiplexing means comprises (b-1) a first line, (b-2) a plurality of second lines, and (b-3) a third line, and the table is capable of further registering correspondences between a virtual channel identifier of the multiplexed virtual channel transmitting voice signals and the second lines, while the cell demultiplexing means further comprises (b-4) distribution means receiving a cell from the incoming line and comparing a virtual channel identifier of the cell with registered contents in the table for transmitting the cell to the first line when the cell belongs to no multiplexed virtual channel transmitting voice signals while distributing the information field of the multiplexed cell to any ones of the second lines on the basis of the correspondences which are registered in the table when the cell is a multiplexed cell belonging to a multiplexed virtual channel transmitting voice signals, (b-5) demultiplexed cell generation means for storing signals in the respective information fields which are distributed to the plurality of second lines to the information fields of the plurality of demultiplexed cells on the basis of the correspondences which are registered in the table and transmitting the demultiplexed cells to the third line, and (b-6) integration means for transmitting the cell which is transmitted to the first line and the demultiplexed cells which are transmitted to the third line to the outgoing line.

In the demultiplexer according to the second aspect of the present invention, the cells transmitted from the incoming line are sorted to those belonging to the multiplexed channel transmitting voice signals and other cells, to be handled. Namely, demultiplexing is carried out on the cells belonging to the multiplexed channel transmitting voice signals, while no demultiplexing is carried out on the remaining cells. Every one of the demultiplexed and non-demultiplexed cells is outputted to the outgoing line by the integration means. According to this demultiplexer, therefore, the cells transmitted from the incoming line are not restricted to those belonging to the multiplexed channel transmitting voice signals to be demultiplexed.

Preferably, cell demultiplexing means further comprises (b-8) FIFO type memory means which is interposed in the third line, and the integration means transmits the cell which is transmitted on the first line to the outgoing line, while reading the demultiplexed cells which are stored in the FIFO type memory means in coincidence with timing causing a vacant cell in the first line as well as inserting the demultiplexed cells in the vacant cell and transmitting the same to the outgoing line.

The demultiplexer according to the second aspect of the present invention preferentially transmits the cell on the first line to the outgoing line as compared with the cell on the third line by the integration means. Further, the FIFO memory means is interposed in the third line, thereby enabling adjustment of the time for transmitting the demultiplexed cells. Thus, it is possible to suppress enlargement of delay times in cells which are not objects of demultiplexing.

Preferably, the demultiplexer further comprises (b-9) FIFO type memory means which is interposed in the first line, and the integration means transmits the demultiplexed cells which are transmitted on the third line to the outgoing line, while reading the cell which is stored in the FIFO type memory means in coincidence with timing causing a vacant cell in the third line as well as inserting the cell in the vacant cell and transmitting the same to the outgoing line.

The demultiplexer according to the second aspect of the present invention preferentially transmits the demultiplexed cells on the third line to the outgoing line as compared with the cells on the first line by the integration means. Further, the FIFO memory means is interposed in the first line, thereby enabling adjustment of the time for transmitting the cells on the first line. Thus, it is possible to suppress enlargement of delay times in cells which are objects of demultiplexing.

According to a third aspect of the present invention, a switching device for relaying a plurality of subscriber's lines and a plurality of internode transmission paths in an asynchronous transfer mode network comprises (a) switching means for switching cells which are transmitted from the plurality of subscriber's lines at virtual channel levels and outputting the cells to any ones of output lines of the same number as the internode transmission paths, and (b) a plurality of multiplexers employing the output lines of the switching means as incoming lines thereof while employing the internode transmission paths as outgoing lines thereof respectively, and each of the plurality of multiplexers is a multiplexer in the asynchronous transfer mode network for multiplexing a plurality of demultiplexed virtual channels transmitting voice signals to a multiplexed virtual channel, while each of the plurality of multiplexers comprises (a) a table capable of registering correspondences between virtual channel identifiers of the plurality of demultiplexed virtual channels transmitting voice signals among virtual channels which are set on an incoming line and positions in an information field of a multiplexed cell belonging to the multiplexed virtual channel which is set on an outgoing line, and (b) cell multiplexing means for receiving demultiplexed cells which are inputted from the incoming line and storing signals in information fields of the demultiplexed cells belonging to the plurality of demultiplexed virtual channels in prescribed positions of the information field of the multiplexed cell for transmitting the multiplexed cell to the outgoing line.

In the switching device according to the third aspect of the present invention, voice signals received from the plurality of subscriber's lines are switched and thereafter multiplexed, to be transmitted to any ones of the plurality of internode transmission paths. In the internode transmission paths for transmitting the voice signals from this switching device, therefore, the band is saved and it is possible to transmit the voice signals with small delay fluctuation.

According to a fourth aspect of the present invention, a switching device for relaying a plurality of subscriber's lines and a plurality of internode transmission paths in an asynchronous transfer mode network comprises (a) a plurality of demultiplexers having incoming lines which are connected to the internode transmission paths respectively, and each of the plurality of demultiplexers is a demultiplexer in the asynchronous transfer mode network for demultiplexing a multiplexed virtual channel transmitting voice signals to a plurality of demultiplexed virtual channels, while each of the plurality of demultiplexers comprises (a) a table capable of registering correspondences between virtual channel identifiers of the plurality of demultiplexed virtual channels transmitting voice signals which are set on an outgoing line and positions in an information field of a multiplexed cell belonging to the multiplexed virtual channel transmitting voice signals among virtual channels which are set on an incoming line, and (b) cell demultiplexing means for receiving the multiplexed cell which is inputted from the incoming line and distributing signals in the information field of the received multiplexed cell to information fields of the plurality of demultiplexed virtual channels for transmitting the plurality of demultiplexed cells to the outgoing line.

In the switching device according to the fourth aspect of the present invention, the multiplexed voice signals which are inputted from the plurality of internode transmission paths are demultiplexed and thereafter switched, to be transmitted to any ones of the plurality of subscriber's lines. In the internode transmission paths for inputting the voice signals in this switching device, therefore, the band is saved and it is possible to transmit the voice signals with small delay fluctuation.

According to a fifth aspect of the present invention, a switching device for relaying a plurality of subscriber's lines and a plurality of internode transmission paths in an asynchronous transfer mode network comprises (a) first switching means for switching cells which are transmitted from the plurality of subscriber's lines at virtual channel levels and outputting the cells to any ones of output lines of the same number as the internode transmission paths, and (b) a plurality of multiplexers employing the output lines of the switching means as incoming lines thereof while employing the internode transmission paths as outgoing lines thereof respectively, and each of the plurality of multiplexers is a multiplexer in the asynchronous transfer mode network for multiplexing a plurality of demultiplexed virtual channels transmitting voice signals to a multiplexed virtual channel, while each of the plurality of multiplexers comprises (c-1) a table capable of registering correspondences between virtual channel identifiers of the plurality of demultiplexed virtual channels transmitting voice signals among virtual channels which are set on an incoming line and positions in an information field of a multiplexed cell belonging to the multiplexed virtual channel which is set on the first outgoing line, and (c-2) cell multiplexing means for receiving demultiplexed cells which are inputted from the first incoming line and storing signals in information fields of the demultiplexed cells belonging to the plurality of demultiplexed virtual channels in prescribed positions of the information field of the multiplexed cell for transmitting the multiplexed cell to the first outgoing line, and the switching device further comprises (d) a plurality of demultiplexers having second incoming lines which are connected to the internode transmission paths respectively, and each of the plurality of demultiplexers is a demultiplexer in the asynchronous transfer mode network for demultiplexing a multiplexed virtual channel transmitting voice signals to a plurality of demultiplexed virtual channels, while each of the plurality of demultiplexers comprises (d-1) a table capable of registering correspondences between virtual channel identifiers of the plurality of demultiplexed virtual channels which are set on a second outgoing line and positions in an information field of a multiplexed cell belonging to the multiplexed virtual channel transmitting voice signals among virtual channels which are set on the second incoming line, and (d-2) cell demultiplexing means for receiving the multiplexed cell which is inputted from the second incoming line and distributing signals in the information field of the received multiplexed cell to information fields of the plurality of demultiplexed virtual channels for transmitting the plurality of demultiplexed cells to the second outgoing line. The switching device further comprises (e) second switching means for switching the cells which are outputted on the respective second outgoing lines of the plurality of demultiplexers at virtual channel levels and outputting the cells to any ones of the plurality of subscriber's lines.

In the switching device according to the fifth aspect of the present invention, voice signals received from the plurality of subscriber's lines are switched and thereafter multiplexed, to be transmitted to any ones of the plurality of internode transmission paths. At the same time, the multiplexed voice signals which are inputted from the plurality of internode transmission paths are demultiplexed and thereafter switched, to be transmitted to any ones of the plurality of subscriber's lines. In the bidirectional internode transmission paths which are connected to this switching device, therefore, the band is saved and it is possible to transmit the voice signals with small delay fluctuation.

According to a sixth aspect of the present invention, a switching device for relaying a plurality of first internode transmission paths and a plurality of second internode transmission paths in an asynchronous transfer mode network comprises (a) a plurality of demultiplexers having first incoming lines which are connected to the first internode transmission paths respectively, and each of the plurality of demultiplexers is a demultiplexer in the asynchronous transfer mode network for demultiplexing a multiplexed virtual channel transmitting voice signals to a plurality of demultiplexed virtual channels, while each of the plurality of demultiplexers comprises (a-1) a table capable of registering correspondences between virtual channel identifiers of the plurality of demultiplexed virtual channels which are set on a first outgoing line and positions in an information field of a multiplexed cell belonging to the multiplexed virtual channel transmitting voice signals among virtual channels which are set on the first incoming line, and (a-2) cell demultiplexing means for receiving the multiplexed cell which is inputted from the first incoming line and distributing signals in the information field of the received multiplexed cell to information fields of the plurality of demultiplexed cells on the basis of the correspondences which are registered in the table and transmitting the plurality of demultiplexed cells to the first outgoing line. The switching device further comprises (b) switching means for switching cells which are outputted on the first outgoing lines of the demultiplexers at virtual channel levels and outputting the cells to any ones of output lines of the same number as the second internode transmission paths, and (c) a plurality of multiplexers employing the output lines of the switching means as second incoming lines thereof while employing the second internode transmission paths as second outgoing lines thereof respectively, and each of the plurality of multiplexers is a multiplexer in the asynchronous transfer mode network for multiplexing a plurality of demultiplexed virtual channels transmitting voice signals to a multiplexed virtual channel, while each of the plurality of multiplexers comprises (c-1) a table capable of registering correspondences between virtual channel identifiers of the plurality of demultiplexed virtual channels transmitting voice signals among virtual channels which are set on the second incoming line and positions in an information field of a multiplexed cell belonging to the multiplexed virtual channel which is set on the second outgoing line, and (c-2) cell multiplexing means for receiving the demultiplexed cells which are inputted from the second incoming line and storing signals in information fields of the demultiplexed cells belonging to the plurality of demultiplexed virtual channels in prescribed positions of the information field of the multiplexed cell and transmitting the multiplexed cell to the second outgoing line.

In the switching device according to the sixth aspect of the present invention, the multiplexed voice signals which are inputted from the plurality of first internode transmission paths are demultiplexed and thereafter switched, to be multiplexed and transmitted to any ones of the plurality of second internode transmission paths. Namely, the multiplexed voice signals which are directed from the first internode transmission paths to the second internode transmission paths are switched between these transmission paths. Therefore, it is possible to switch multiplexed voice signals by employing this device.

According to a seventh aspect of the present invention, a switching device for relaying a plurality of first internode transmission paths and a plurality of second internode transmission paths in an asynchronous transfer mode network comprises (a) a plurality of first demultiplexers having first incoming lines which are connected to the first internode transmission paths respectively, and each of the plurality of first demultiplexers is a demultiplexer in the asynchronous transfer mode network for demultiplexing a multiplexed virtual channel transmitting voice signals to a plurality of demultiplexed virtual channels, while each of the plurality of first demultiplexers comprises (a-1) a table capable of registering correspondences between virtual channel identifiers of the plurality of demultiplexed virtual channels which are set on a first outgoing line and positions in an information field of a multiplexed cell belonging to the multiplexed virtual channel transmitting voice signals among virtual channels which are set on the first incoming line, and (a-2) cell demultiplexing means for receiving the multiplexed cell which is inputted from the first incoming line and distributing signals in an information field of the received multiplexed cell to information fields of the plurality of demultiplexed virtual channels on the basis of the correspondences which are registered in the table for transmitting the plurality of demultiplexed cells to the first outgoing line. The switching device further comprises (b) first switching means for switching cells which are outputted on the first outgoing lines of the first demultiplexers at virtual channel levels and outputting the cells to any ones of first output lines of the same number as the second internode transmission paths, and (c) a plurality of first multiplexers employing the first output lines of the first switching means as second incoming lines thereof while employing the second internode transmission paths as second outgoing lines thereof respectively, and each of the plurality of first multiplexers is a multiplexer in the asynchronous transfer mode network for multiplexing a plurality of demultiplexed virtual channels transmitting voice signals to a multiplexed virtual channel, while each of the plurality of first multiplexers comprises (c-1) a table capable of registering correspondences between virtual channel identifiers of the plurality of demultiplexed virtual channels transmitting voice signals among virtual channels which are set on second incoming line and positions in an information field of a multiplexed cell belonging to the multiplexed virtual channel which is set on the second outgoing line, and (c-2) cell multiplexing means for receiving demultiplexed cells which are inputted from the second incoming line and storing signals in information fields of the demultiplexed cells belonging to the plurality of demultiplexed virtual channels in prescribed positions of the information field of the multiplexed cell on the basis of the correspondences which are registered in the table for transmitting the multiplexed cell to the second outgoing line. The switching device further comprises (d) a plurality of second demultiplexers having third incoming lines which are connected to the second internode transmission paths respectively, and each of the plurality of second demultiplexers is a demultiplexer in the asynchronous transfer mode network for demultiplexing a multiplexed virtual channel transmitting voice signals to a plurality of demultiplexed virtual channels, while each of the plurality of second demultiplexers comprises (d-1) a table capable of registering correspondences between virtual channel identifiers of the plurality of demultiplexed virtual channels which are set on a third outgoing line and positions in an information field of a multiplexed cell belonging to the multiplexed virtual channel transmitting voice signals among virtual channels which are set on the third incoming line, and (d-2) cell demultiplexing means for receiving the multiplexed cell which is inputted from the third incoming line and distributing signals in an information field of the received multiplexed cell to information fields of the plurality of demultiplexed virtual channels on the basis of the correspondences which are registered in the table for transmitting the plurality of demultiplexed cells to the third outgoing line. The switching device further comprises (e) second switching means for switching cells which are outputted on the third outgoing lines of the plurality of second demultiplexers at virtual channel levels and outputting the cells to any ones of second output lines of the same number as the first internode transmission paths, and (f) a plurality of second multiplexers employing the second output lines of the second switching means as fourth incoming lines thereof while employing the first internode transmission paths as fourth outgoing lines thereof respectively, and each of the plurality of second multiplexers is a multiplexer in the asynchronous transfer mode network for multiplexing a plurality of demultiplexed virtual channels transmitting voice signals to a multiplexed virtual channel, while each of the plurality of second multiplexers comprises (f-1) a table capable of registering correspondences between virtual channel identifiers of the plurality of demultiplexed virtual channels transmitting voice signals among virtual channels which are set on the fourth incoming line and positions in an information field of a multiplexed cell belonging to the multiplexed virtual channel which is set on the fourth outgoing line, and (f-2) cell multiplexing means for receiving the demultiplexed cells which are inputted from the fourth incoming line and storing signals in information fields of the demultiplexed cells belonging to the plurality of demultiplexed virtual channels in prescribed positions of the information field of the multiplexed cell on the basis of the correspondences which are registered in the table for transmitting the multiplexed cell to the fourth outgoing line.

In the switching device according to the seventh aspect of the present invention, the multiplexed voice signals which are inputted from the plurality of first internode transmission paths are demultiplexed and thereafter switched, to be multiplexed and transmitted to any ones of the plurality of second internode transmission paths. At the same time, the multiplexed voice signals which are inputted from the plurality of second internode transmission paths are demultiplexed and thereafter switched, to be multiplexed and transmitted to any ones of the plurality of first internode transmission paths. Therefore, the multiplexed voice signals are bidirectionally switched between the first and second internode transmission paths. Namely, it is possible to switch multiplexed bidirectional voice signals by employing this device.

According to an eighth aspect of the present invention, a network adapter for relaying a synchronous mode transmission path in a synchronous transfer mode network and an asynchronous mode transmission path in an asynchronous transfer mode path comprises (a) interface means for demultiplexing a time-division multiplexed signal which is transmitted from the synchronous mode transmission path and transmitting the same to a plurality of first output lines, (b) cell adaptation means for setting virtual channels which are varied with the first output lines and storing the demultiplexed signals in information fields of cells belonging to the virtual channels, thereby carrying out cellularization, (c) integration means for transmitting the cellularized signals to a second output line, and (d) a multiplexer having the second output line as an incoming line and the asynchronous mode transmission path as an outgoing line, and the multiplexer is a multiplexer in the asynchronous transfer mode network for multiplexing a plurality of demultiplexed virtual channels transmitting voice signals to a multiplexed virtual channel, while the multiplexer comprises (d-1) a table capable of registering correspondences between virtual channel identifiers of the plurality of demultiplexed virtual channels transmitting voice signals among virtual channels which are set on the incoming line and positions in an information field of a multiplexed cell belonging to the multiplexed virtual channel which is set on the outgoing line, and (d-2) cell multiplexing means for receiving demultiplexed cells which are inputted from the incoming line and storing signals in information fields of the demultiplexed cells belonging to the plurality of demultiplexed virtual channels in prescribed positions of the information field of the multiplexed cell on the basis of the correspondences which are registered in the table for transmitting the multiplexed cell to the outgoing line.

In the network adapter according to the eighth aspect of the present invention, the voice signals which are inputted from the synchronous mode transmission path are multiplexed and transmitted to the asynchronous mode transmission path. In the asynchronous mode transmission path to which the voice signals are transmitted from this network adapter, therefore, the band is saved and it is possible to transmit the voice signals with small delay fluctuation.

According to a ninth aspect of the present invention, a network adapter for relaying a synchronous mode transmission path in a synchronous transfer mode network and an asynchronous mode transmission path in an asynchronous transfer mode path comprises (a) a demultiplexer having an incoming line which is connected to the asynchronous mode transmission path, and the demultiplexer is a demultiplexer in the asynchronous transfer mode network for demultiplexing a multiplexed virtual channel transmitting voice signals to a plurality of demultiplexed virtual channels, while the demultiplexer comprises (a-1) a table capable of registering correspondences between virtual channel identifiers of the plurality of demultiplexed virtual channels transmitting voice signals which are set on an outgoing line and positions in an information field of a multiplexed cell belonging to the multiplexed virtual channel among virtual channels which are set on the incoming line, and (a-2) cell demultiplexing means for receiving the multiplexed cell which is inputted from the incoming line and distributing a signal in an information field of the received multiplexed cell to information fields of the plurality of demultiplexed cells on the basis of the correspondences which are registered in the table for transmitting the plurality of demultiplexed cells to the outgoing line, and the network adapter further comprises (b) distribution means for distributing cells which are outputted on the outgoing line of the demultiplexer to output lines which are varied with virtual channels and transmitting the same, (c) adaptation means for taking out the signals from the information fields of the cells which are transmitted to the output lines of the distribution means, and (d) interface means for time-division multiplexing the signals as being taken out for transmitting the same to the synchronous mode transmission path.

In the network adapter according to the ninth aspect of the present invention, the multiplexed voice signals which are inputted from the asynchronous mode transmission path are demultiplexed and transmitted to the synchronous mode transmission path. In the asynchronous mode transmission path for inputting the voice signals in this network adapter, therefore, the band is saved and it is possible to transmit the voice signals with small delay fluctuation.

According to a tenth aspect of the present invention, a network adapter for relaying a synchronous mode transmission path in a synchronous transfer mode network and an asynchronous mode transmission path in an asynchronous transfer mode path comprises (a) first interface means for demultiplexing a time-division multiplexed signal which is transmitted from the synchronous mode transmission path and transmitting the same to a plurality of first output lines, (b) first adaptation means for setting virtual channels which are varied with the first output lines and storing the demultiplexed signals in information fields of cells belonging to the virtual channels, thereby carrying out cellularization, (c) integration means for transmitting the cellularized signals to a second output line, and (d) a first multiplexer having the second output line as a first incoming line and the asynchronous mode transmission path as a first outgoing line, and the first multiplexer is a multiplexer in the asynchronous transfer mode network for multiplexing a plurality of demultiplexed virtual channels transmitting voice signals to a multiplexed virtual channel, while the multiplexer comprises (d-1) a table capable of registering correspondences between virtual channel identifiers of the plurality of demultiplexed virtual channels transmitting voice signals among virtual channels which are set on the first incoming line and positions in an information field of a multiplexed cell belonging to the multiplexed virtual channel which is set on the first outgoing line, and (d-2) cell multiplexing means for receiving demultiplexed cells which are inputted from the first incoming line and storing signals in information fields of the demultiplexed cells belonging to the plurality of demultiplexed virtual channels in prescribed positions of the information field of the multiplexed cell on the basis of the correspondences which are registered in the table for transmitting the multiplexed cell to the first outgoing line. The network adapter further comprises (e) a demultiplexer having a second incoming line which is connected to the asynchronous mode transmission path, and the demultiplexer is a demultiplexer in the asynchronous transfer mode network for demultiplexing a multiplexed virtual channel transmitting voice signals to a plurality of demultiplexed virtual channels, while the demultiplexer comprises (e-1) a table capable of registering correspondences between virtual channel identifiers of the plurality of demultiplexed virtual channels transmitting voice signals which are set on the outgoing line and positions in an information field of a multiplexed cell belonging to the multiplexed virtual channel among virtual channels which are set on the second incoming line, and (e-2) cell demultiplexing means for receiving the multiplexed cell which is inputted from the second incoming line and distributing a signal in an information field of the received multiplexed cell to information fields of the plurality of demultiplexed cells on the basis of the correspondences which are registered in the table for transmitting the plurality of demultiplexed cells to the second outgoing line. The network adapter further comprises (f) distribution means for distributing cells which are outputted on the second outgoing line of the demultiplexer to third output lines which are varied with virtual channels and transmitting the same, (g) second adaptation means for taking out the signals in the information fields of the cells which are transmitted to the third output lines of the distribution means, and (h) second interface means for time-division multiplexing the signals as being taken out for transmitting the same to the synchronous mode transmission path.

In the network adapter according to the tenth aspect of the present invention, the voice signals which are inputted from the synchronous mode transmission path are multiplexed and transmitted to the asynchronous mode transmission path. At the same time, the multiplexed voice signals which are inputted from the asynchronous mode transmission path are demultiplexed and transmitted to the synchronous mode transmission path. In a bidirectional asynchronous mode transmission path which is connected to this network adapter, therefore, the band is saved and it is possible to transmit the voice signals with small delay fluctuation.

Accordingly, an object of the present invention is to provide a switching device and a network adapter enabling effective use of network bands in transmission of voice signals, and a multiplexer and a demultiplexer forming principal parts thereof.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Principle of Embodiment>

Figure 17:
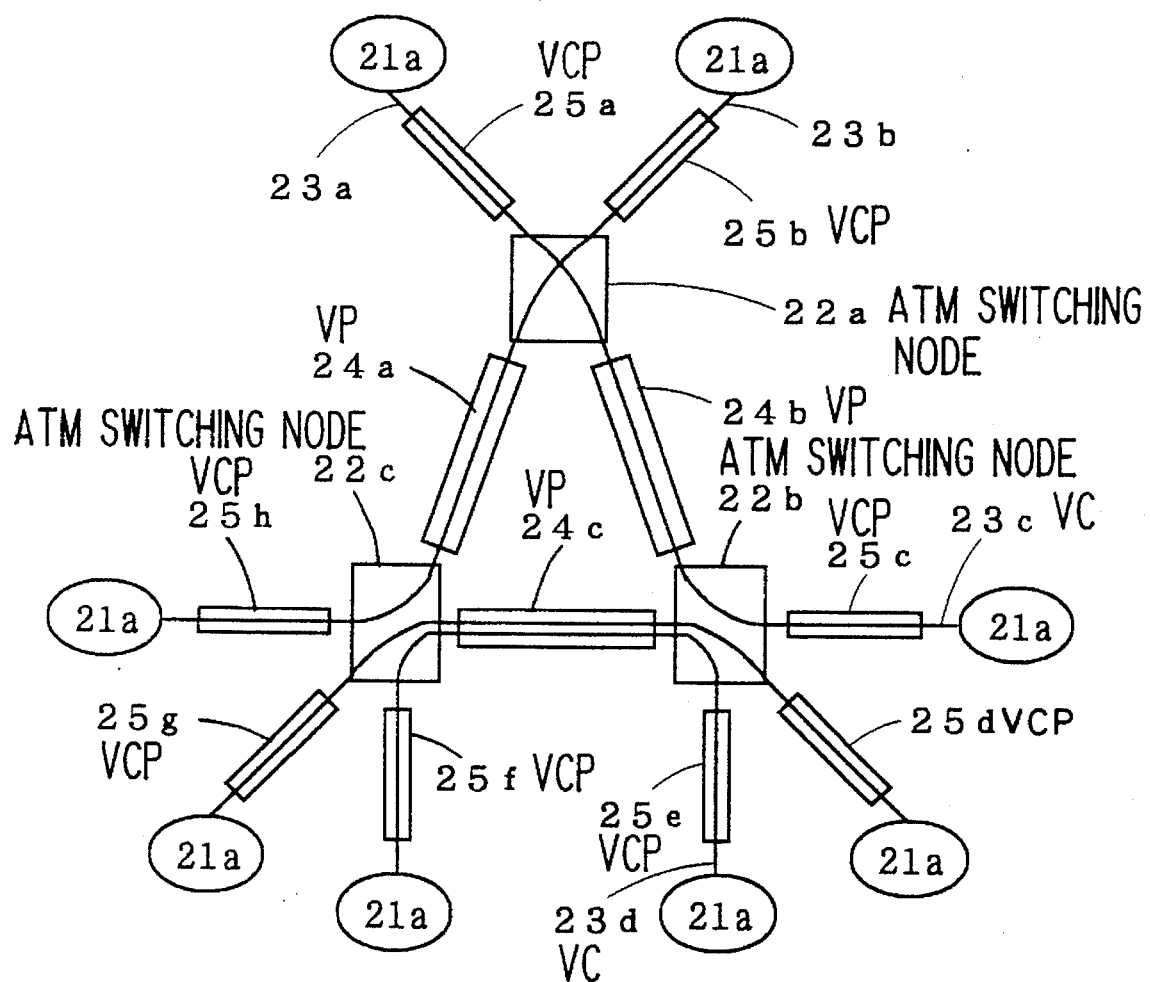
FIG. 17 is a block diagram showing an ATM network.

Before describing respective embodiments of the present invention, the principle of each embodiment is now described. In the ATM network illustrated in FIG. 17, two VCs $23c$ and $23d$ are set for the VP $24c$ which is provided between the switching nodes $22c$ and $22b$ over a certain period. According to the present invention, a new VC (multiplexing VC) is set for the VP $24c$ during this period, while the two VCs $23c$ and $23d$ are multiplexed into this multiplexing VC. Namely, voice signals to be transmitted by the VCs $23c$ and $23d$ are stored in cells transmitted by the multiplexed VC.

Thus enabled is transmission in a small delay, with no waste of the network band. In order to multiplex the VCs $23c$ and $23d$ in the VP $24c$, multiplexers for executing multiplexing and demultiplexers for restoring multiplexed signals to original modes are set on both of the switching nodes $22b$ and $22c$. It is possible to implement multiplexing in bidirectional transmission paths which are held between the respective switching nodes 22 in the ATM network, by setting the multiplexers and the demultiplexers in the respective switching nodes 22.

Figure 2:
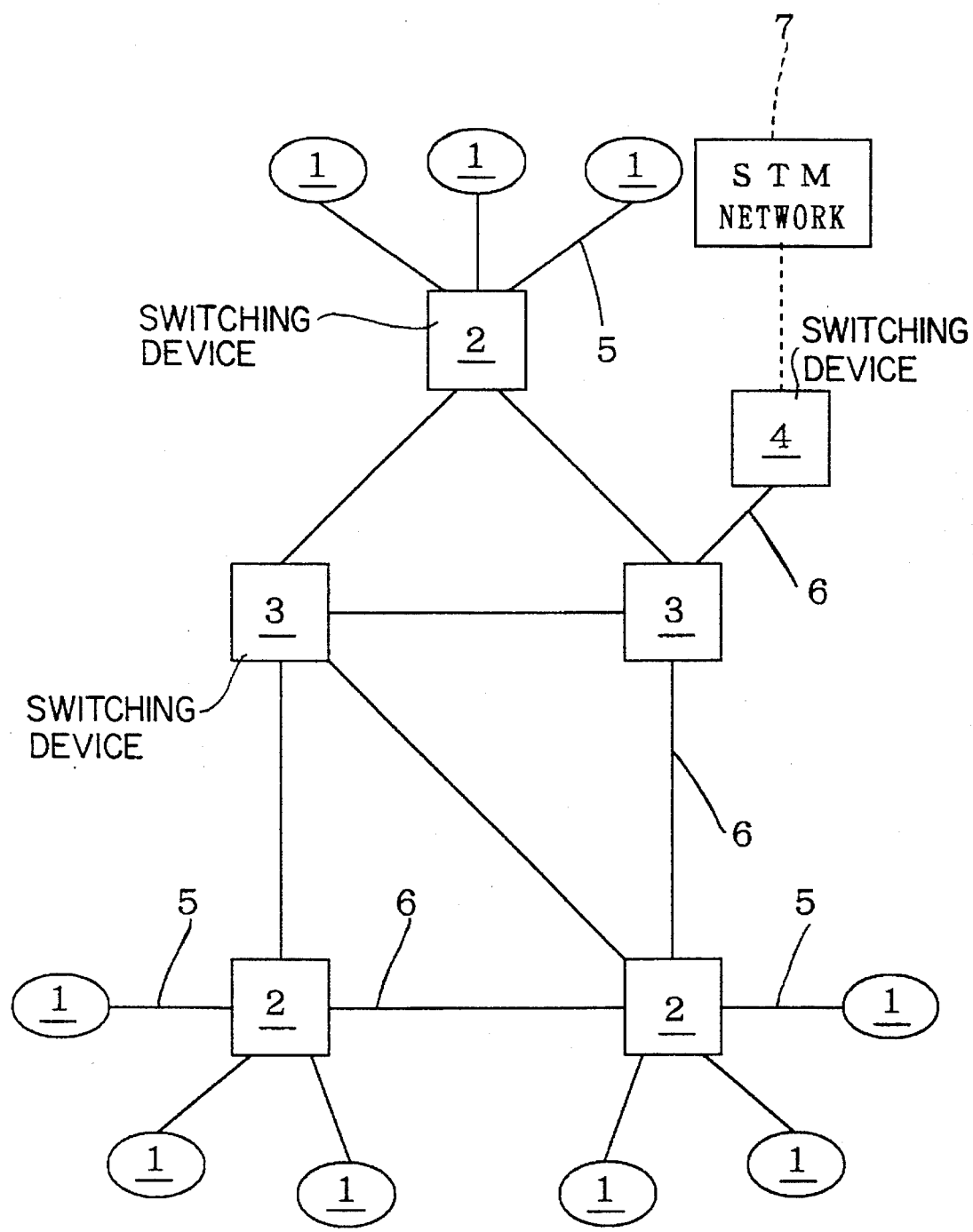
FIG. 2 is a block diagram showing a network to which each embodiment of the present invention is applied.

FIG. 2 is a block diagram showing another exemplary structure of an ATM network. Referring to FIG. 2, exemplary multiplexers and demultiplexers provided in switching nodes (switching devices) 2 which are connected with subscribers 1 by subscriber's lines 5 are shown in first to third embodiments. Further, exemplary multiplexers and demultiplexers set in switching nodes (switching devices) 3 which are interposed between internode transmission paths 6 are shown in fourth and fifth embodiments. In addition, examples set in a network adapter 4 serving as an interface between an STM (synchronous transfer mode) network 7 and the ATM network is shown in each of sixth to eighth embodiments. Structures of multiplexers and demultiplexers forming principal parts of the apparatuses according to the respective embodiments are described in detail with reference to the first and second embodiments respectively.

<1. First Embodiment>

First, an apparatus according to the first embodiment of the present invention is described.

<1-1. Structure and Operation of Switching Device 2>

Figure 3:
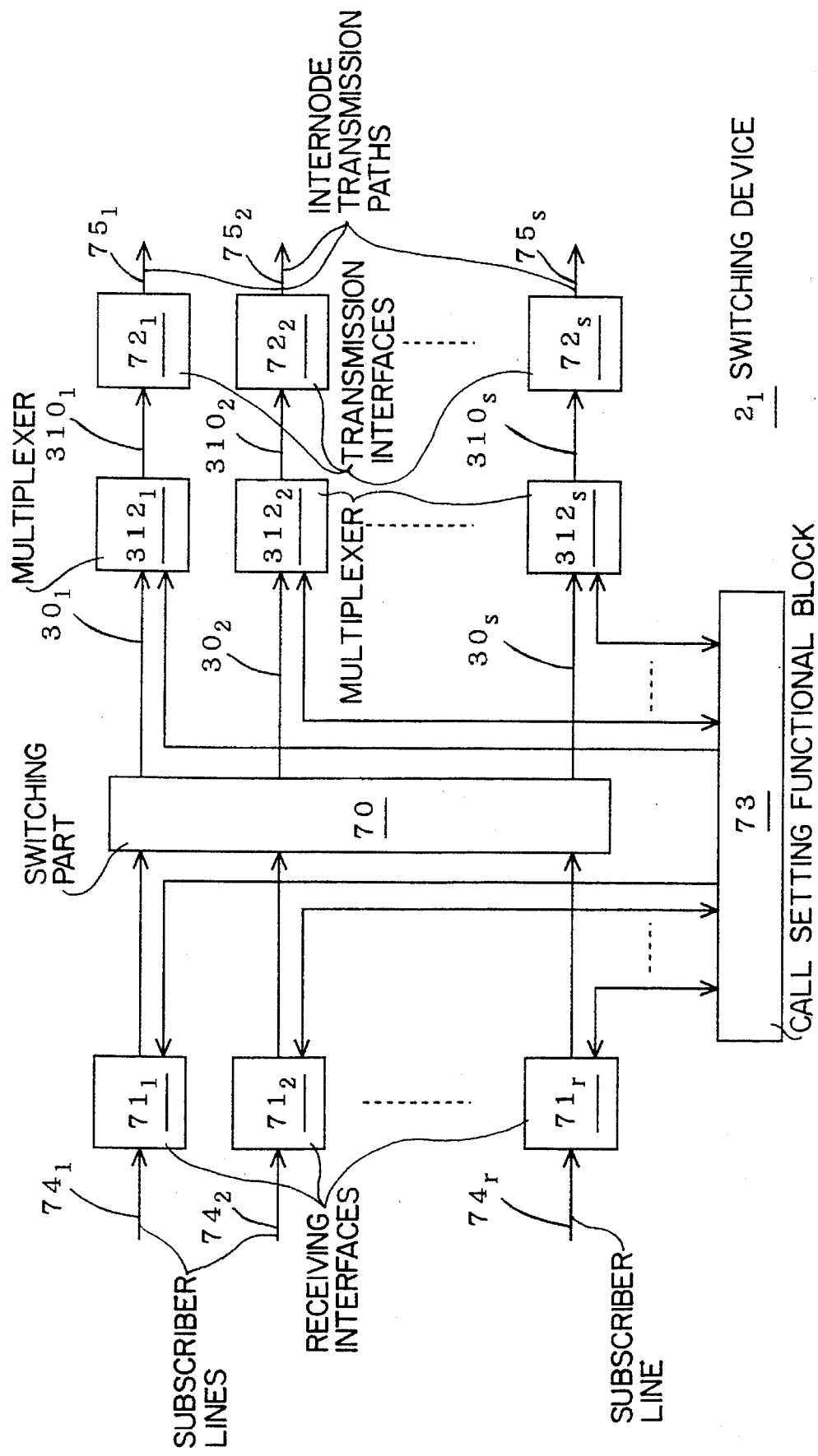
FIG. 3 is a block diagram showing a switching device according to the first embodiment of the present invention.

FIG. 3 is an internal block diagram showing a device part $2_1$ for relaying signals which are transmitted from subscriber's line sides to internode transmission path sides in a switching device 2 according to this embodiment. As shown in FIG. 3, cells storing various signals including voice signals are transmitted through subscriber's lines $74_1$ to $74_r$, through VCs which are varied with the subscribers. However, there may exist a subscriber employing a plurality of VCs. Receiving interfaces $71_1$ to $71_r$ which are connected with the subscriber's lines $74_1$ to $74_r$ carry out physical layer processing, VP end processing, used volume parameter control (UPC), reloading of VPIs and VCIs, addition of switching headers and the like.

In order to provide an SVC (switching virtual channel) service which is the most general service mode, the respective receiving interfaces $71_1$ to $71_r$ require control by a call setting functional block 73. The call setting functional block 73 summarizes information as to currently set VCs and the like.

A switching part 70 switches the cells which are transmitted from the receiving interfaces $71_1$ to $71_r$ at VC levels in accordance with information of switching headers, removes the switching headers and thereafter transmits the cells to any ones of lines $30_1$ to $30_s$. Each of multiplexers $312_1$ to $312_s$ multiplexes a plurality of voice signals VCs in the same VP which is set in each of the lines $30_1$ to $30_s$ into a multiplexing VC which is set independently thereof. In an ordinary case of providing the SVC service, the multiplexers $312_1$ to $312_s$ require control by the call setting functional block 73.

Transmission interfaces $72_1$ to $72_s$ receive the cells from the multiplexers $312_1$ to $312_s$, carry out physical layer processing, and thereafter transmit the cells to internode transmission paths $75_1$ to $75_s$. The receiving interfaces $71_1$ to $71_r$, the switching part 70, the transmission interfaces $72_1$ to $72_s$ and the call setting functional block 73 are well-known device parts.

<1-2. Structure and Operation of Multiplexer>

Figure 1:
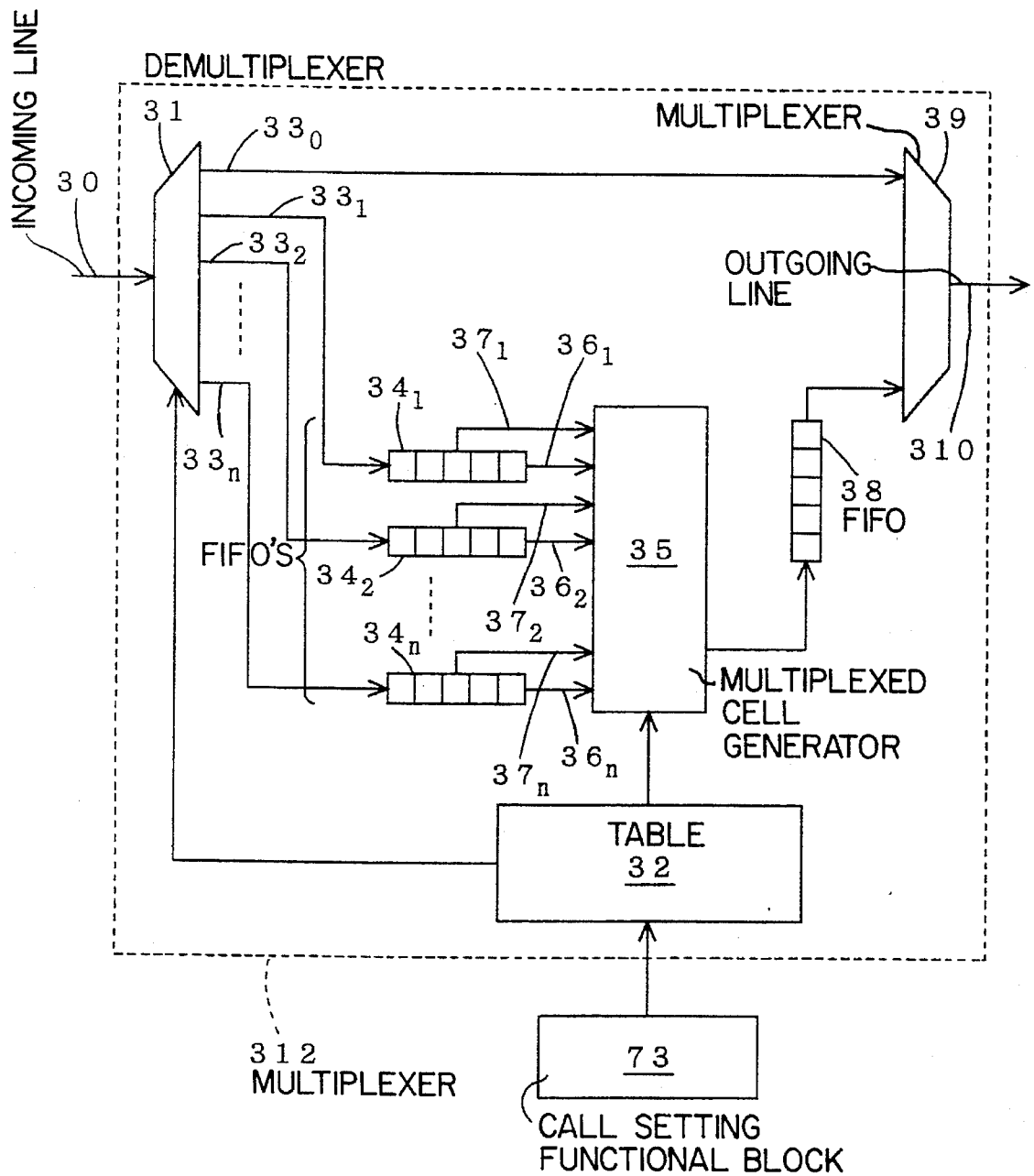
FIG. 1 is a block diagram showing a multiplexer according to a first embodiment of the present invention.
Figure 18:
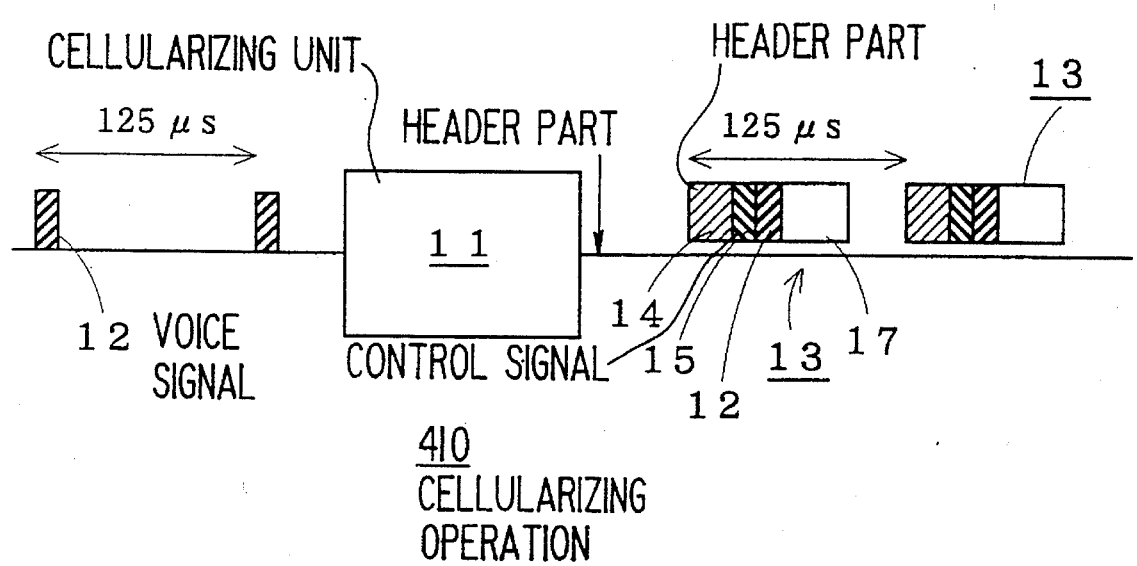
FIG. 18 is an explanatory diagram showing a cellularizing operation in an ATM network.

The internal structure and the operation of each of the multiplexers $312_1$ to $312_s$ are now described. FIG. 1 is a block diagram showing the internal structure of a multiplexer 312, which is one of the multiplexers $312_1$ to $312_s$. Referring to FIG. 1, an incoming line 30 which is one of the lines $30_1$ to $30_s$ transmits a cell storing various signals including a voice signal. When the cell stores a voice signal, an information field part 10 stores 2 octet signals, as shown in FIG. 18.

A demultiplexer 31 distributes the received cell in accordance with its VCI. Namely, the demultiplexer 31 sorts and transmits the inputted cell to any one of a plurality of lines $33_0$ to $33_n$, through information which is registered in a table 32 serving as a storage medium. When the VCI of the received cell is not registered in the table 32, i.e., when the same is not a cell storing a voice signal, this cell is transmitted to the line $33_0$.

The table 32 registers VCIs of cells transmitting voice signals, as well as correspondences between such VCIs and positions in a multiplexed cell described later. The table 32 further registers correspondences between the VCIs of the cells transmitting voice signals and the lines $33_1$ to $33_n$.

As to the contents registered in the table 32, VCIs and line numbers may be allotted at the time of contract agreement when the network provides only a PVC (point-to-point virtual channel) service, and it is not necessary to thereafter change the contents. When the network provides the SVC service as an ordinary case, on the other hand, the contents registered in the table 32 are reloaded in accordance with information from the call setting functional block 73 every setting and releasing of VCs.

When the VCI of the received cell is registered in the table 32, i.e., when the same is a cell storing a voice signal, the demultiplexer 31 sorts and transmits only the 2 octet signals stored in the information field part 10 of the cell to any one of the corresponding lines $33_1$ to $33_n$. The lines $33_1$ to $33_n$ are connected to FIFOs $34_1$ to $34_n$, respectively. The FIFOs $34_1$ to $34_n$ have functions of temporarily storing signals and outputting data in inputted order. The respective FIFOs $34_1$ to $34_n$ are periodically read by a multiplexed cell generator 35. Each of the FIFOs $34_1$ to $34_n$ may have several stages in general.

<1-3. Operation of Multiplexed Cell Generator>

A multiplexing operation in the multiplexed cell generator 35 is now described. The multiplexed cell generator 35 reads signal trains in units of 2 octets, which are stored in the FIFOs $34_1$ to $34_n$, successively from the oldest one through lines $36_1$ to $36_n$, respectively, in cycles of 125 μsec. The FIFOs $34_1$ to $34_n$ are adapted to absorb delay fluctuation (fluctuation appearing in time delays) of the cells which are stored in periods between transmission of the cells from the subscriber and arrival at the multiplexer 312.

When an overflow (OF: such a state that the FIFOs $34_1$ to $34_n$ are filled with memory signals at write timing) or an underrun (UR: such a state that the FIFOs $34_1$ to $34_n$ are vacant at read timing) of the FIFOs $34_1$ to $34_n$ results from large delay fluctuation, this fact is transmitted to the multiplexed cell generator 35 through lines $37_1$ to $37_n$ respectively. The multiplexed cell generator 35, which can recognize unused lines with reference to the table 32, reads no signal with respect to the lines.

Figure 4:
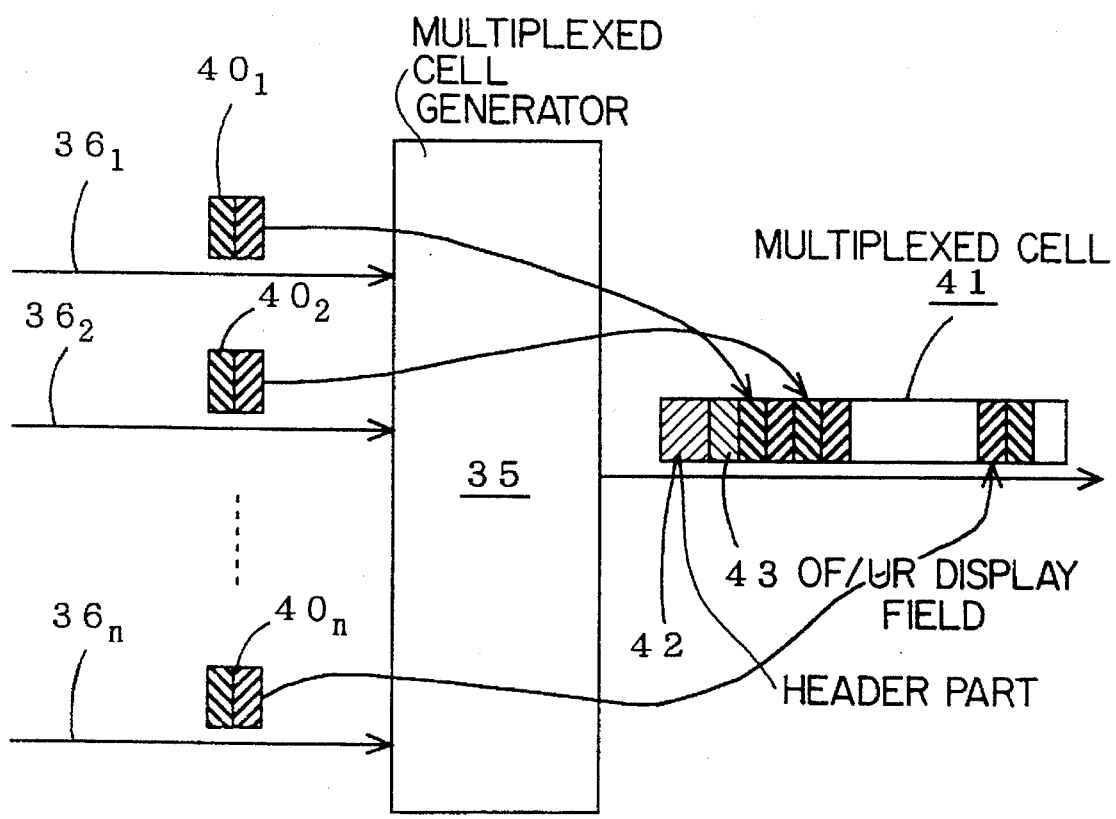
FIG. 4 illustrates the operation of a multiplexed cell generator according to the first embodiment of the present invention.

As shown in an operation explanatory diagram of FIG. 4, signals $40_1$ to $40_n$ in units of 2 octets which are read from the respective FIFOs $34_1$ to $34_n$ are written in prescribed positions of a multiplexed cell 41 on the basis of the correspondences registered in the table 32. In the multiplexed cell 41, a 2-octet OF/UR display field 43 and the signals $40_1$ to $40_n$ are stored in information field parts following a header part 42 of 5 octets. Namely, a single multiplexed cell 41 stores voice signals on 23 VCs at the maximum.

The multiplexed cell 41 is identified by a specific VCI value which is provided in correspondence to a newly set multiplexing VC. The VCI value is written in a VCI field provided in the header part 42. The head 2-octet OF/UR display field 43 following the header part 42 can display an OF and an UR in two of the lines $37_1$ to $37_n$ at the maximum.

Namely, signals written in the OF/UR display field 43 display an OF and an UR in one bit while displaying line numbers in 7 bits (line number=0 indicates that neither OF nor UR takes place) every octet. The multiplexed cell 41 is transmitted in the cycle of 125 μsec. after completion of all writing.

Thus, the multiplexed cell 41 transmits voice signals with information on the OF and the UR. Therefore, it is possible to efficiently process the multiplexed cell on the basis of the information on the OF and the UR in a demultiplexer, for example.

Due to the aforementioned operation, it is possible to multiplex voice signals of 23 channels at the maximum into one multiplexing VC. If the number of channels to be multiplexed exceeds the maximum number, two or more multiplexing VCs may be set for independently carrying out processing every multiplexing VC. Namely, the number n of the lines $33_0$ to $33_n$ shown in FIG. 1 is not limited to 23 but can be set at the maximum number of VCs for transmitting voice signals, which can be simultaneously set in one line 30.

When cells belonging to different VPs are included, the same are not multiplexed into one multiplexing VC, but multiplexing VCs are prepared for the respective VPs for carrying out multiplexing. This is because there is such a possibility that different VPs must be separated on different lines in a VP cross connector before carrying out demultiplexing in a next ATM switching node in the ATM network.

A multiplexer 39 transmits the cell on the line $33_0$ to an outgoing line 310. On the other hand, the multiplexed cell 41 which is transmitted from the multiplexed cell generator 35 every 125 μsec. is temporarily stored in an FIFO 38, inserted in a vacant cell which is detected by the multiplexer 39 on the line $33_0$, and transmitted to the outgoing line 310. The FIFO 38 is adapted to adjust the transmission timing for the multiplexed cell 41. In general, several stages are sufficient for the FIFO 38.

Namely, the cell on the line $33_0$, which is not regarded as the object of multiplexing, is preferentially transmitted to the outgoing line 310. Thus, it is possible to suppress enlargement of delay fluctuation in the signal which is not regarded as the object of multiplexing. Therefore, the structure of this multiplexer 312 is suitable for such a case that signals such as video signals having stricter conditions with respect to delay fluctuation than voice signals are inputted with the voice signals.

Due to the aforementioned structure and operation of the switching device 2, the voice signal VCs from the subscriber are multiplexed to a single multiplexed VC every 23 channels at the maximum. Thus, it is possible to remarkably save the band in the internode transmission paths $75_1$ to $75_s$ for transmitting the signals from the switching device 2, as well as to transmit the voice signals with small delay fluctuation (not more than several cell times, depending on mounting).

<2. Second Embodiment>

A device according to the second embodiment of the present invention is now described.

<2-1. Structure and Operation of Switching Device 2>

Figure 5:
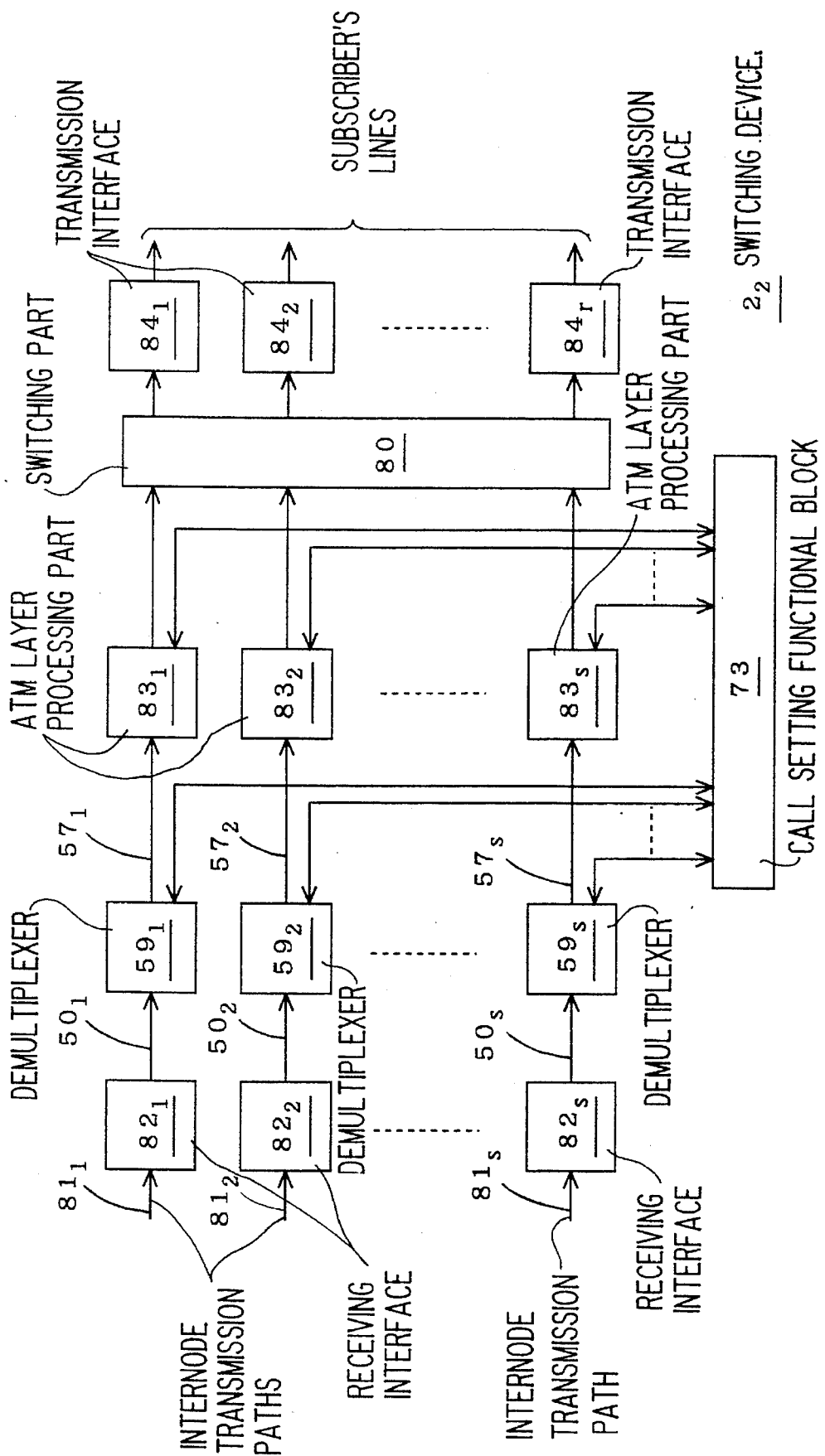
FIG. 5 is a block diagram showing a switching device according to a second embodiment of the present invention.

FIG. 5 is an internal block diagram showing a device part $2_2$ relaying signals which are transmitted from internode transmission paths to subscriber's lines in a switching device 2 according to this embodiment. Referring to FIG. 5, cells including multiplexing VCs are transmitted from internode transmission paths $81_1$ to $81_s$ respectively. Receiving interfaces $82_1$ to $82_s$ carry out physical layer processing. The respective receiving interfaces $82_1$ to $82_s$ transmit cells to demultiplexers $59_1$ to $59_s$ through lines $50_1$ to $50_s$.

The demultiplexers $59_1$ to $59_s$ demultiplex the signals from the multiplexing VCs, and generate cells of demultiplexed voice signal VCs. When an SVC service is provided in the most general case, the demultiplexers $59_1$ to $59_s$ require control by a call setting functional block 73. The cells of the voice signal VCs as generated are inputted in ATM layer processing parts $83_1$ to $83_s$.

The ATM layer processing parts $83_1$ to $83_s$ carry out VP end processing, used volume parameter control (UPC), reloading of VPIs and VCIs, addition of switching headers and the like. When the SVC service is provided, the ATM layer processing parts $83_1$ to $83_s$ require control by the call setting functional block 73.

A switching part 80 switches the cells transmitted from the ATM layer processing parts $83_1$ to $83_s$ at VC levels in accordance with information of switching headers, removes the switching headers and thereafter transmits the cells to any ones of transmission interfaces $84_1$ to $84_r$. The transmission interfaces $84_1$ to $84_r$ receive the cells from the switching part 80, carry out physical layer processing thereon, and transmit the cells to subscriber's lines $85_1$ to $85_r$. The receiving interfaces $82_1$ to $82_r$, the ATM layer processing parts $83_1$ to $83_s$, the switching part 80, the transmission interfaces $84_1$ to $84_r$ and the call setting functional block 73 are well-known device parts.

<2-2. Structure and Operation of Demultiplexer>

Figure 6:
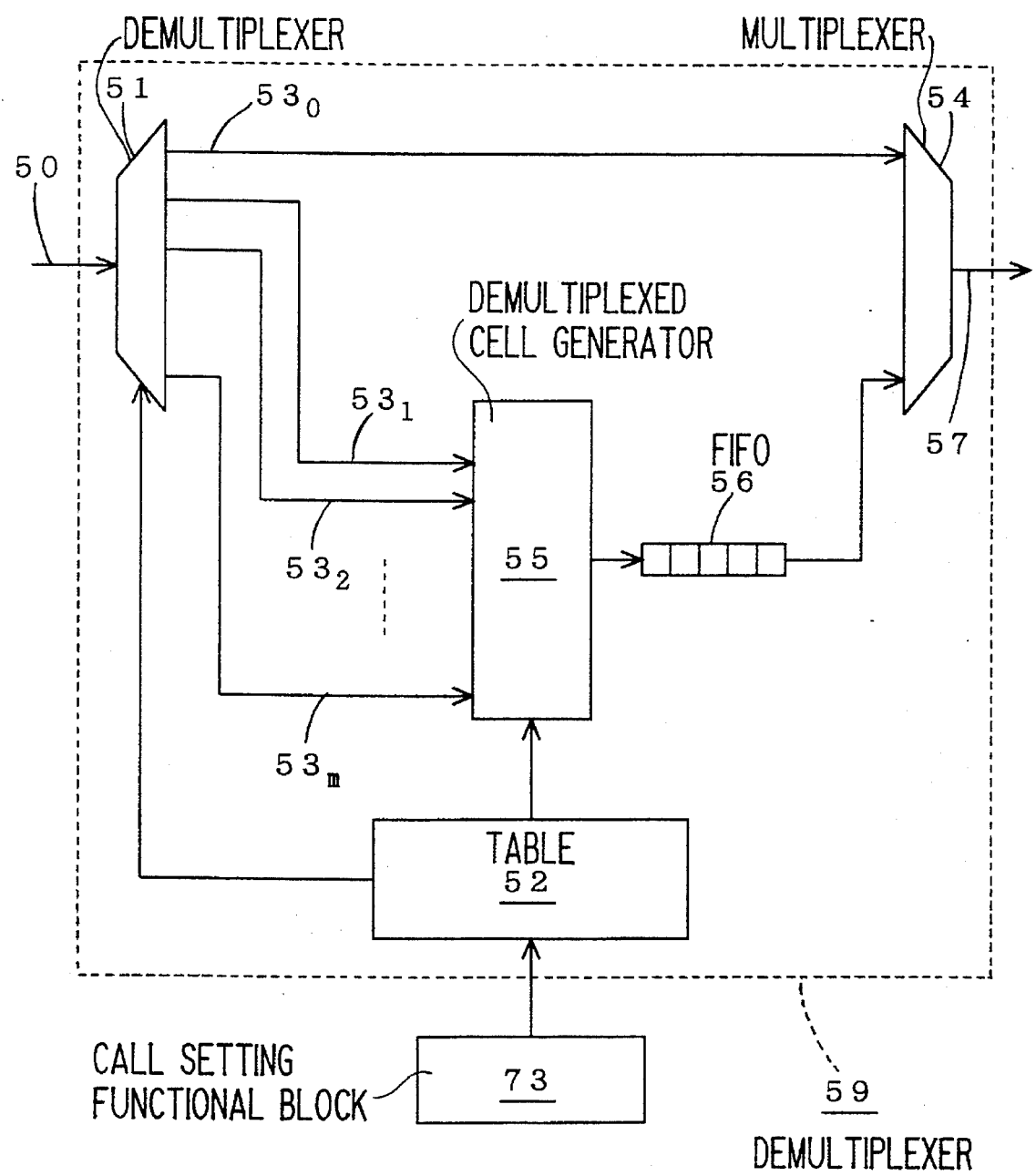
FIG. 6 is a block diagram showing a demultiplexer according to the second embodiment of the present invention.

The internal structure and the operation of each of the demultiplexers $59_1$ to $59_s$ are now described. FIG. 6 is a block diagram showing the internal structure of a demultiplexer 59, which is one of the demultiplexers $59_1$ to $59_s$.

Referring to FIG. 6, a demultiplexer 51 receives a cell from an incoming line 50, which is one of the lines $50_1$ to $50_s$, and distributes the received cell in accordance with its VCI. Namely, the demultiplexer 51 sorts and transmits the received cell to any one of a plurality of lines $53_0$ to $53_m$ through information registered in a table 52 serving as a storage medium. When the VCI of the received cell is not registered in the table 52, i.e., when the same is not a multiplexed cell, this cell is transmitted to the line $53_0$.

The table 52 registers VCIs of multiplexed cells, and correspondences between the VCIs of the multiplexed cells and the lines $53_1$ to $53_m$. The table 52 further registers correspondences between positions in the multiplexed cells and VCIs of demultiplexed VCs.

As to the contents registered in the table 52, VCIs and line numbers as well as positions in the multiplexed cells and VCIs may be allotted at the time of contract agreement when the network provides only a PVC (point-to-point virtual channel) service, and it is not necessary to thereafter change the contents. When the network provides the SVC service as an ordinary case, on the other hand, the contents registered in the table 52 are reloaded in accordance with information from the call setting functional block 73 every setting and releasing of VCs.

This reloading is carried out in relation to information reloading in other multiplexers in the network. To this end, information may be exchanged by a well-known method such as (1) a method employing call control messages, or (2) a method employing specific OAM (operation and maintenance) cells (cells transmitting information for implementing OAM functions such as quality monitoring of media, fee management and maintenance), for example.

When the VCI of the received cell is registered in the table 52, i.e., when the received cell is a multiplexed cell, the demultiplexer 51 distributes and transmits the information field part of the cell to the lines $53_1$ to $53_m$ on the basis of the correspondences registered in the table 52. All information field parts transmitted to the lines $53_1$ to $53_m$ are read by a demultiplexed cell generator 55.

<2-3. Operation of Demultiplexed Cell Generator>

Figure 7:
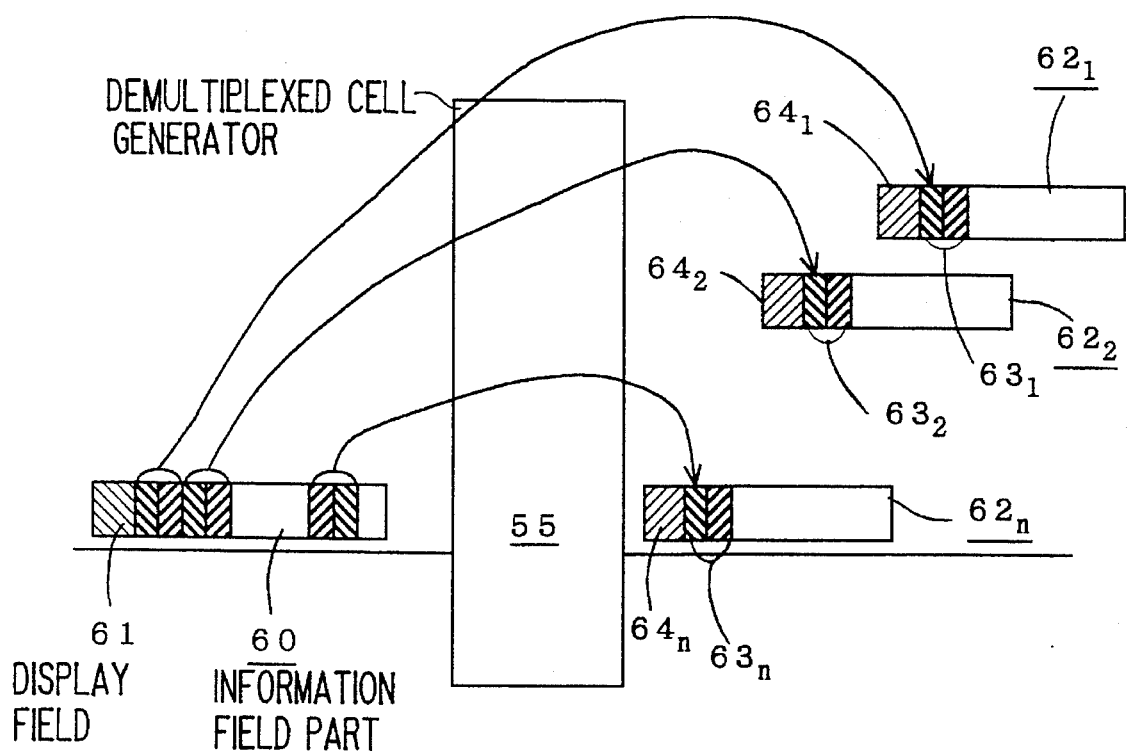
FIG. 7 illustrates the operation of a demultiplexed cell generator according to the second embodiment of the present invention.
Figure 8:
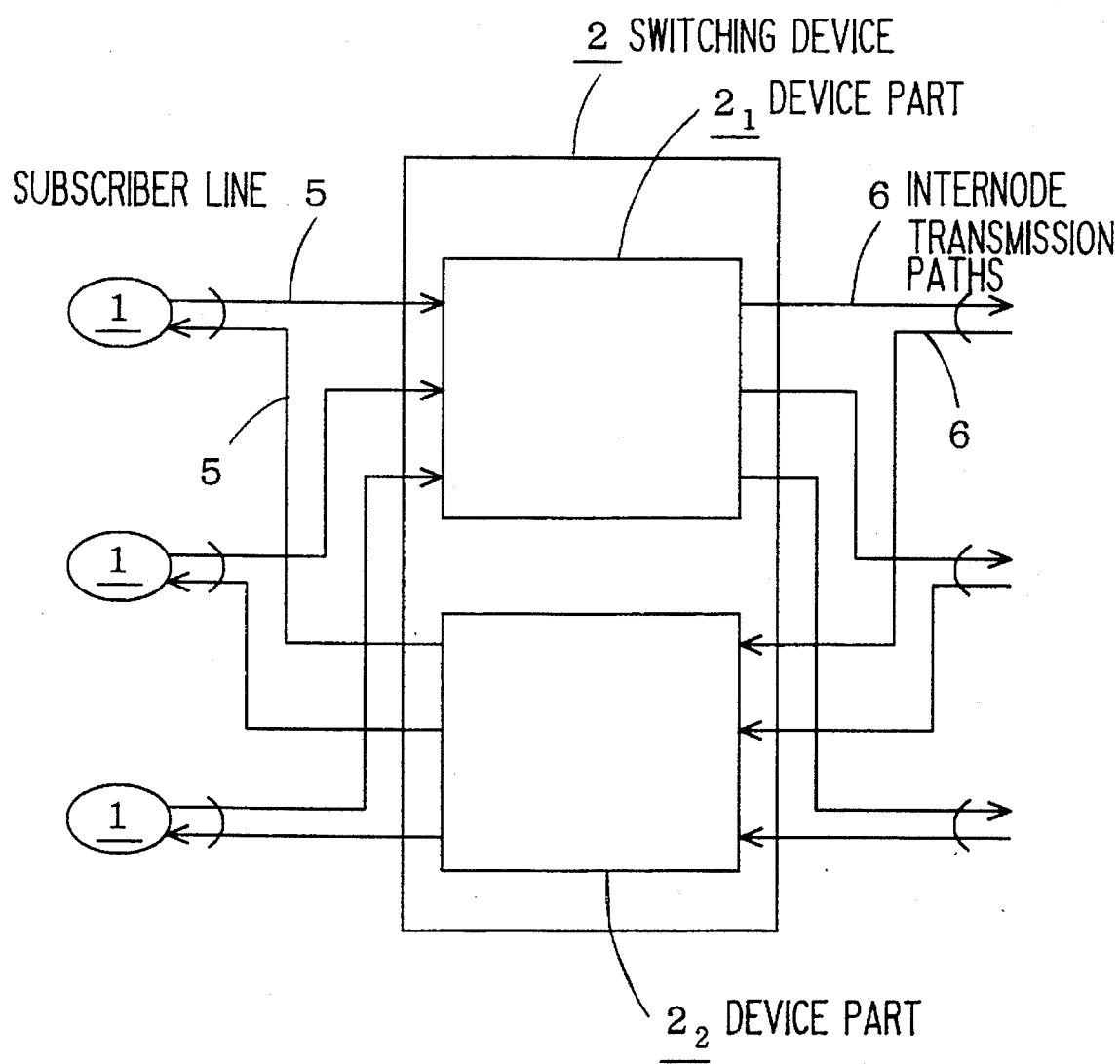
FIG. 8 is a block diagram showing a switching device according to a third embodiment of the present invention.

A demultiplexing operation in the demultiplexed cell generator 55 is now described with reference to an operation explanatory diagram of FIG. 7. When an information field part 60 of a multiplexed cell is received through each of the lines $53_1$ to $53_m$, the demultiplexed cell generator 55 distributes signals $63_1$ to $63_n$ following a 2-octet display field 61 to cells $62_1$ to $62_n$ of respective demultiplexed VCs on the basis of the correspondences registered in the table 52.

Each of the signals $63_1$ to $63_n$ is a signal of 2 octets in total consisting of a 1 octet control signal and a 1 octet voice signal. Each of the signals $63_1$ to $63_n$ is written in head 2 octets of a cell information field part of each of the demultiplexed cells $62_1$ to $62_n$. Further, the values of the VCIs registered in the table 52 are written in VCI fields of header parts $64_1$ to $64_n$ of the respective demultiplexed cells $62_1$ to $62_n$.

Referring again to FIG. 6, the demultiplexed cells $62_1$ to $62_n$ as generated are stored in an FIFO 56 in this order. A display field 61 which is positioned on head 2 octets in the information part 60 of the multiplexed cell displays an overflow (OF) and an underrun (UR) in the FIFO of the multiplexer. Namely, the display field 61 displays an OF or an UR in one bit while displaying positions in the cell in 7 bits (position=0 indicates that neither OF nor UR takes place) every octet.

When the display field 61 displays occurrence of an UR, the demultiplexed cell generator 55 carries out no generation of cells of corresponding demultiplexed VCs. When occurrence of an OF is displayed, on the other hand, ordinary processing is carried out. Alternatively, another proper processing may be carried out. Thus, the demultiplexer 59 efficiently processes the multiplexed cell on the basis of information of the display field 61. The aforementioned demultiplexing processing is in the demultiplexed cell generator 55 is carried out every multiplexing VC, i.e., every line 53.

A multiplexer 54 transmits the cell on the line $53_0$ to an outgoing line 57. On the other hand, the demultiplexed cells $62_1$ to $62_n$ generated by the demultiplexer 55 are temporarily stored in the FiFO 56, inserted in a vacant cell which is detected by the multiplexer 54 on the line $53_0$, and transmitted to the outgoing line 57. The FIFO 56 is adapted to adjust the timing for transmitting the demultiplexed cells $62_1$ to $62_n$.

Namely, the cell on the line $53_0$, which is not regarded as the object of demultiplexing, is preferentially transmitted to the outgoing line 57. Thus, it is possible to suppress enlargement of delay fluctuation in the signal which is not regarded as the object of demultiplexing. Therefore, the structure of this demultiplexer 59 is suitable for such a case that signals such as video signals having stricter conditions with respect to delay fluctuation than voice signals are inputted with multiplexed voice signals.

Due to the aforementioned structure and operation of the switching device 2, voice signals of 23 channels at the maximum which are multiplexed into a single multiplexed VC are demultiplexed and returned to the original cells. When the switching device according to this embodiment is combined with that of the first embodiment, therefore, it is possible to remarkably save the band in internode transmission paths which are held between these switching devices with small delay fluctuation.

<3. Third Embodiment>

A device according to the third embodiment of the present invention is now described. This switching device 2 comprises the device parts $2_1$ and $2_2$ of the first and second embodiments. Due to this structure, the switching device 2 has both functions of the two device parts $2_1$ and $2_2$. Namely, voice signals which are transmitted from subscriber's lines 5 are multiplexed and transmitted to internode transmission paths 6, while multiplexed voice signals which are transmitted from the internode transmission paths are demultiplexed and transmitted to the subscriber's lines 5 by the switching device 2. Thus, it is possible to transmit demultiplexed voice signals in the subscriber's lines 5 while transmitting multiplexed voice signals in the internode transmission paths 6 in both of transmission and receiving directions by employing the switching device 2.

<4. Fourth Embodiment>

Figure 9:
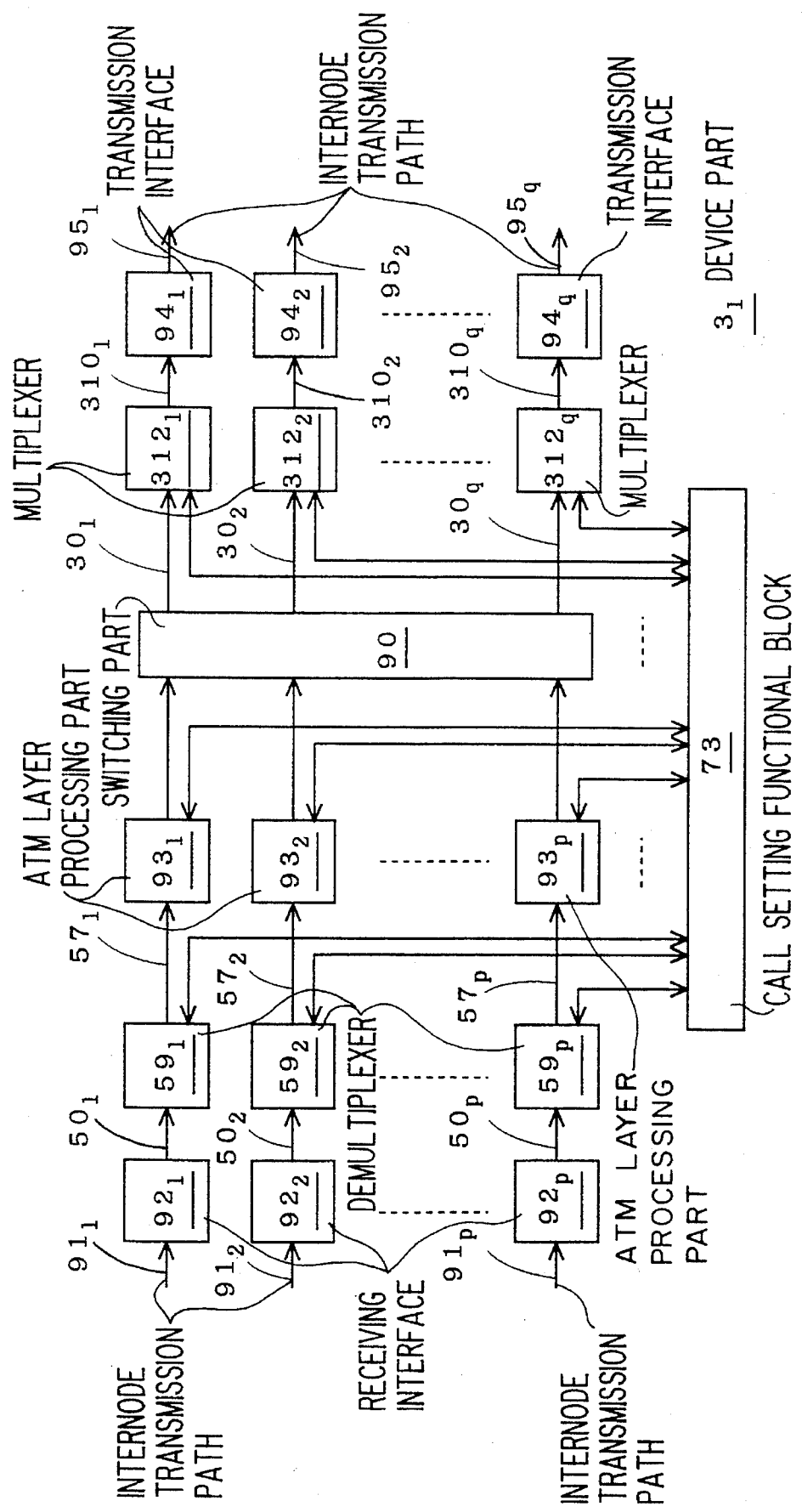
FIG. 9 is a block diagram showing a switching device according to a fourth embodiment of the present invention.

A device according to the fourth embodiment of the present invention is now described. FIG. 9 is an internal block diagram showing a device part $3_1$ for relaying unidirectionally transmitted signals in a switching device 3 according to this embodiment. An input side of a switching part 90 in the device part $3_1$, i.e., internode transmission paths $91_1$ to $91_p$, receiving interfaces $92_1$ to $92_p$, demultiplexers $59_1$ to $59_p$ according to the second embodiment, and ATM layer processing parts $93_1$ to $93_p$, is structured similarly to the input side of the switching part 80 in the device part $2_2$ (FIG. 5) according to the second embodiment. Further, an output side of the switching part 90, i.e., multiplexers $312_1$ to $312_q$ according to the first embodiment, transmission interfaces $94_1$ to $94_q$ and internode transmission paths $95_1$ to $95_q$, is structured similarly to the output side of the switching part 70 in the device part $2_1$ according to the first embodiment.

This device part $3_1$ temporarily demultiplexes multiplexing VCs which are set in receiving side internode transmission paths, thereby enabling exchange of ordinary demultiplexed cells at VC levels. Namely, the switching part 90 is structured similarly to that stored in a switching device which is interposed between conventional internode transmission paths. The exchanged demultiplexed cells are thereafter multiplexed and transmitted to the internode transmission paths $95_1$ to $95_q$.

Therefore, it is possible to exchange multiplexed voice signals in internode transmission paths by employing this device part $3_1$.

<5. Fifth Embodiment>

Figure 10:
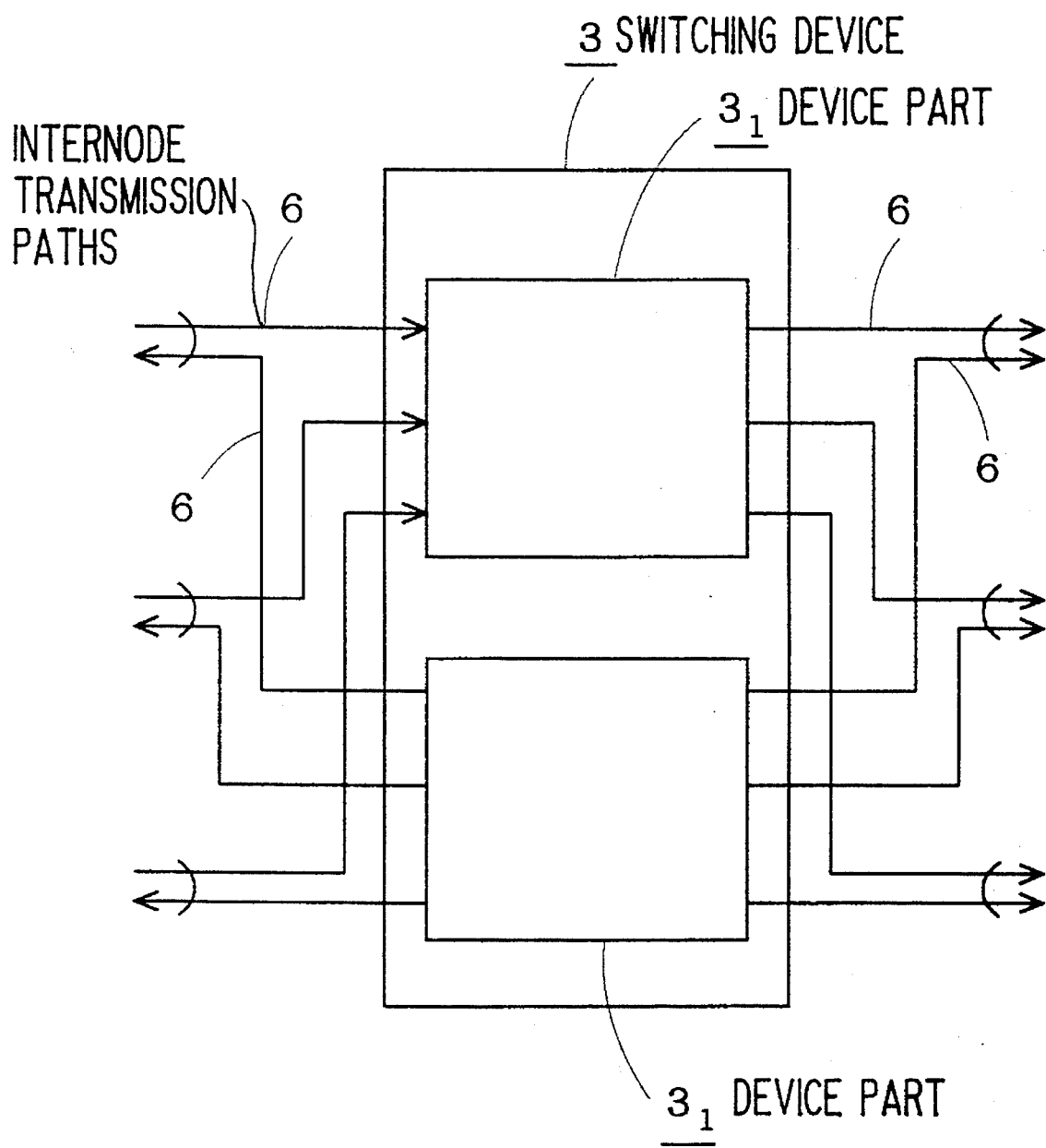
FIG. 10 is a block diagram showing a switching device according to a fifth embodiment of the present invention.

A device according to the fifth embodiment of the present invention is now described. FIG. 10 is a block diagram showing the structure of a switching device 3 according to this embodiment. This switching device 3 comprises two device parts $3_1$ in the fourth embodiment in parallel with and opposite to each other. Therefore, it is possible to exchange multiplexed voice signals which are transmitted to internode transmission paths 6 in both of transmission and receiving directions.

<6. Sixth Embodiment>

Figure 11:
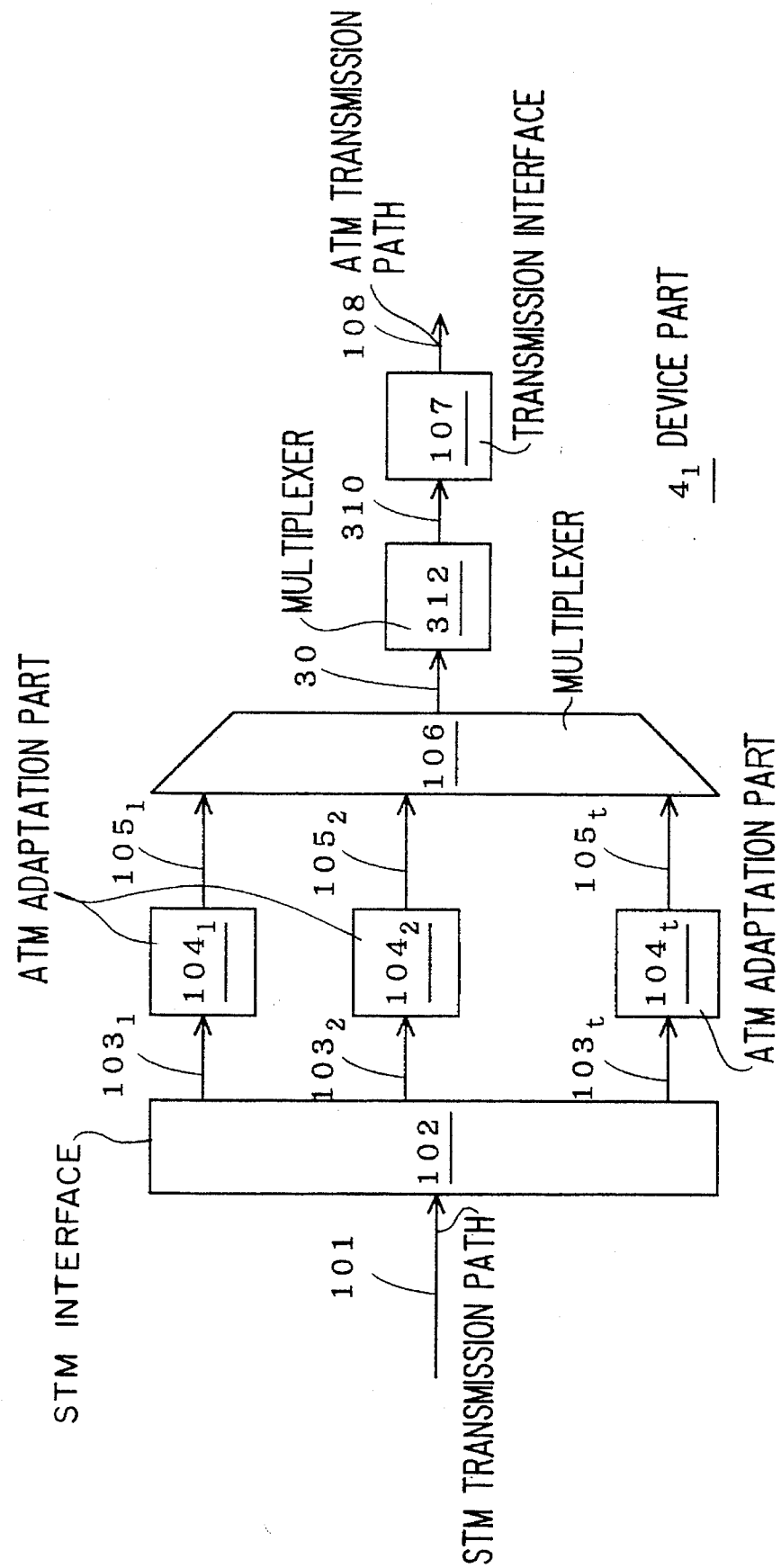
FIG. 11 is a block diagram showing a network adapter according to a sixth embodiment of the present invention.

A device according to the sixth embodiment of the present invention is now described. FIG. 11 is an internal block diagram showing a device part $4_1$ for relaying signals which are transmitted from an STM transmission path to an ATM transmission path in a network adapter 4.

Referring to FIG. 11, time-division multiplexed voice signals are transmitted from an STM (synchronous transfer mode) transmission path (synchronous mode transmission path) 101. An STM interface 102 demultiplexes the time-division multiplexed voice signals every STM channel, to distribute and transmit the same to any ones of lines $103_1$ to $103_r$. This STM interface 102 can be formed by that which is employed in a conventional STM network.

ATM adaptation parts $104_1$ to $104_r$, allot VCs of ATM to respective STM channels, and cellularize the voice signals in a similar manner to that shown in FIG. 18. A multiplexer 106 transmits the cells as generated for the respective VCs to a line 30. A multiplexer 312 according to the first embodiment multiplexes a plurality of voice signal VCs in the same VP which are inputted from the line 30 into a multiplexing VC. A transmission interface 107 receives the multiplexed cell from the multiplexer 312, carries out physical layer processing, and transmits the multiplexed cell to an ATM transmission path (asynchronous mode transmission path) 108.

Due to the aforementioned operation of the device part $4_1$, it is possible to form a network adapter comprising a multiplexing function of multiplexing voice signals transmitted from an STM network and transmitting the same to an ATM network by employing this device part $4_1$.

<7. Seventh Embodiment>

Figure 12:
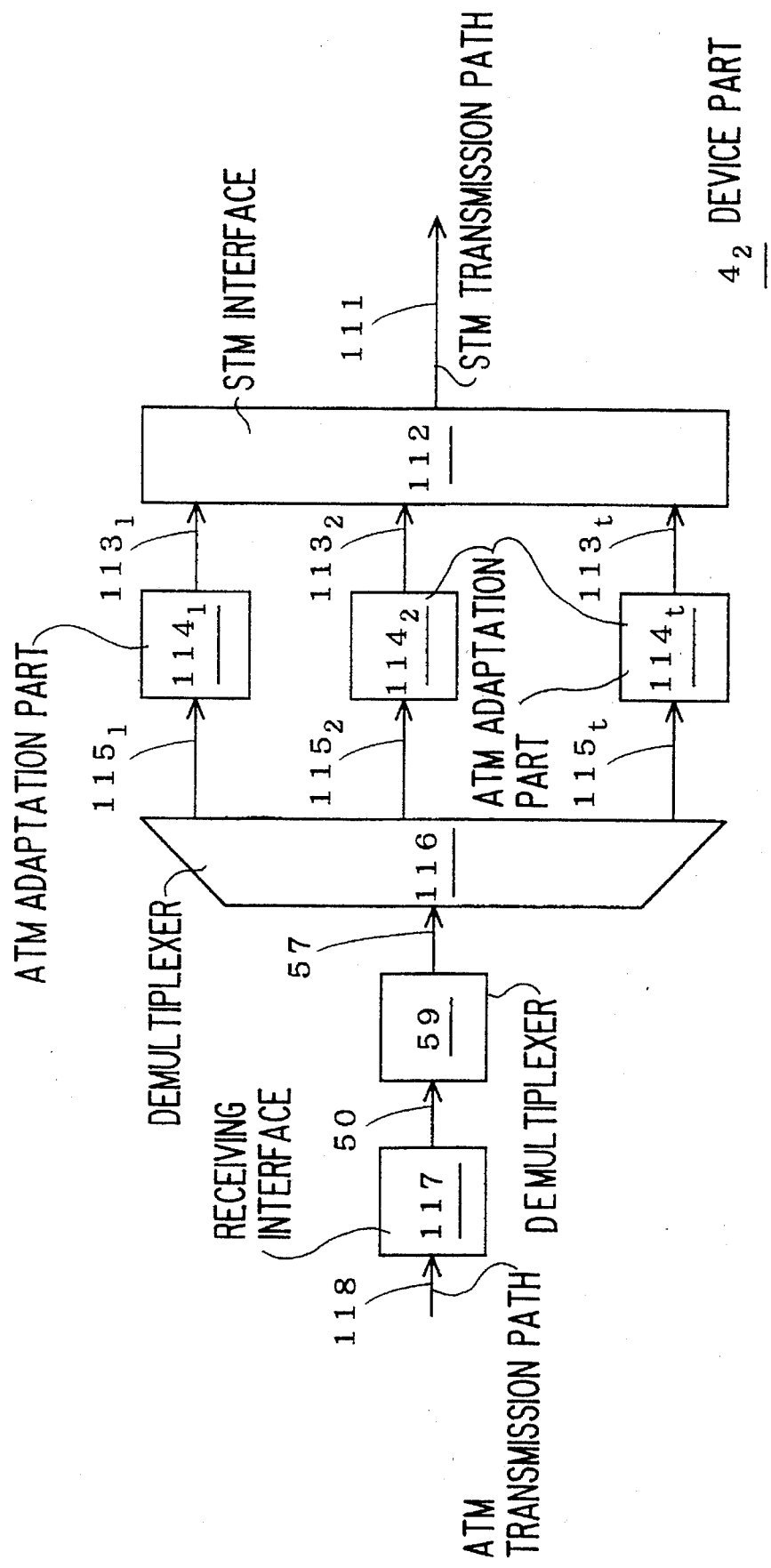
FIG. 12 is a block diagram showing a network adapter according to a seventh embodiment of the present invention.

A device according to the seventh embodiment of the present invention is now described. FIG. 12 is an internal block diagram showing a device part $4_2$ for relaying signals which are transmitted from an ATM transmission path to an STM transmission path in a network adapter 4. Cells including multiplexed cells which are transmitted from an ATM transmission path 118 are subjected to physical layer processing in a receiving interface 117, and thereafter inputted in a demultiplexer 59 according to the second embodiment.

The demultiplexer 59 demultiplexes multiplexing VCs transmitting voice signals to demultiplexing VCs. Namely, the demultiplexer 59 receives cells from the receiving interface 117, and demultiplexes the cells if the same belong to multiplexed VCs, thereby generating demultiplexed cells of voice signal VCs.

A demultiplexer 116 distributes and transmits the demultiplexed cells to lines $115_1$ to $115_t$, which are varied with demultiplexed VCs. ATM adaptation parts $114_1$ to $114_t$ take out control signals and voice signals from the demultiplexed cells and transmit 1-octet signals to lines $113_1$ to $113_t$ every 125 μsec. An STM interface 112 time-division multiplexes a plurality of channels of voice signals, and transmits the same to an STM transmission path 111. This STM interface 112 can be formed by that employed in a conventional STM network.

Due to the aforementioned operation of the device part $4_2$, it is possible to form a network adapter comprising a demultiplexing function of demultiplexing multiplexed voice signals transmitted from an ATM network and transmitting the same to an STM network by employing this device part $4_2$.

<8. Eighth Embodiment>

Figure 13:
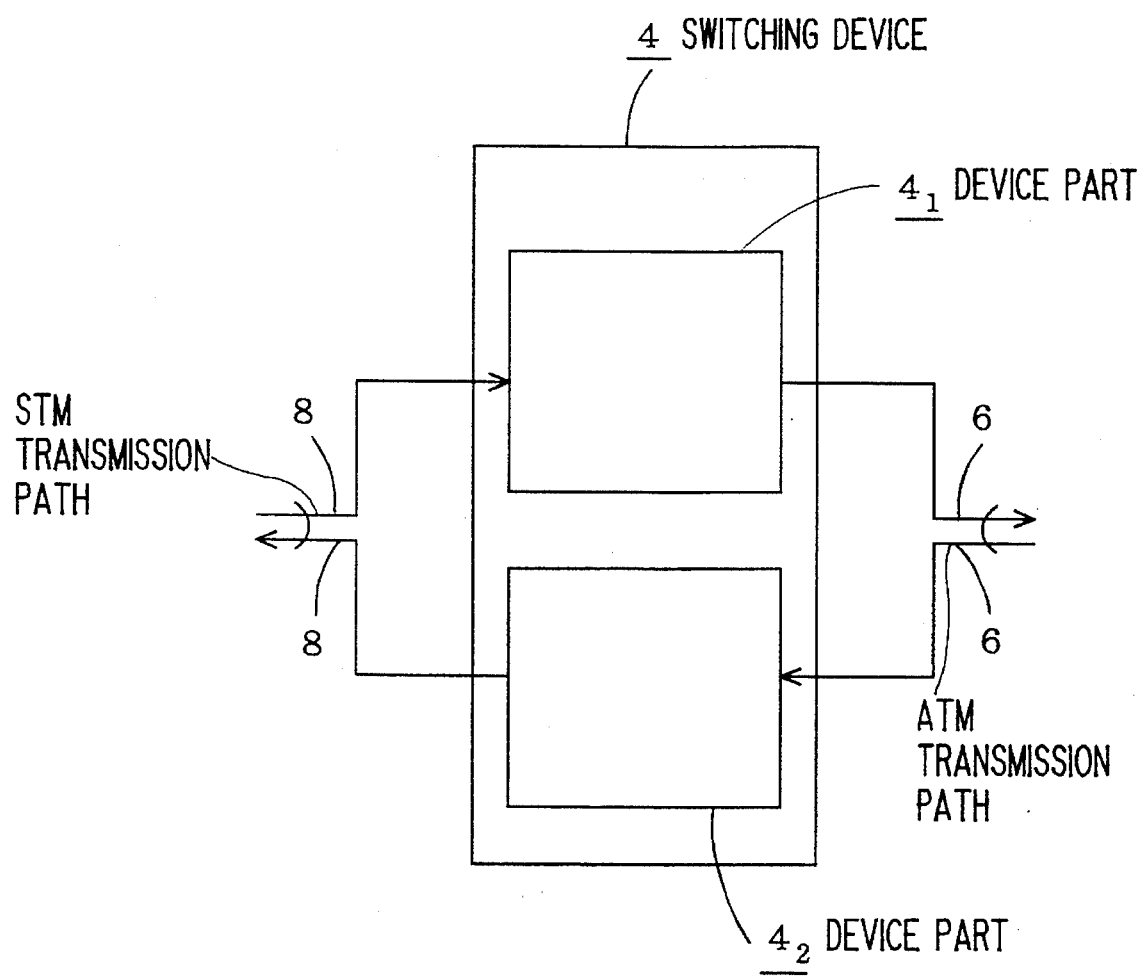
FIG. 13 is a block diagram showing a network adapter according to an eighth embodiment of the present invention.

A device according to the eighth embodiment of the present invention is now described. FIG. 13 is a block diagram showing a switching device 4 according to this embodiment. This switching device 4 comprises the device parts $4_1$ and $4_2$ according to the sixth and seventh embodiments in parallel with each other. Therefore, it is possible to relay multiplexed voice signals which are transmitted to an ATM transmission path 6 and voice signals which are transmitted to an STM transmission path 8 in both of transmission and receiving directions by employing this switching device 4.

<9. Ninth Embodiment>

Figure 14:
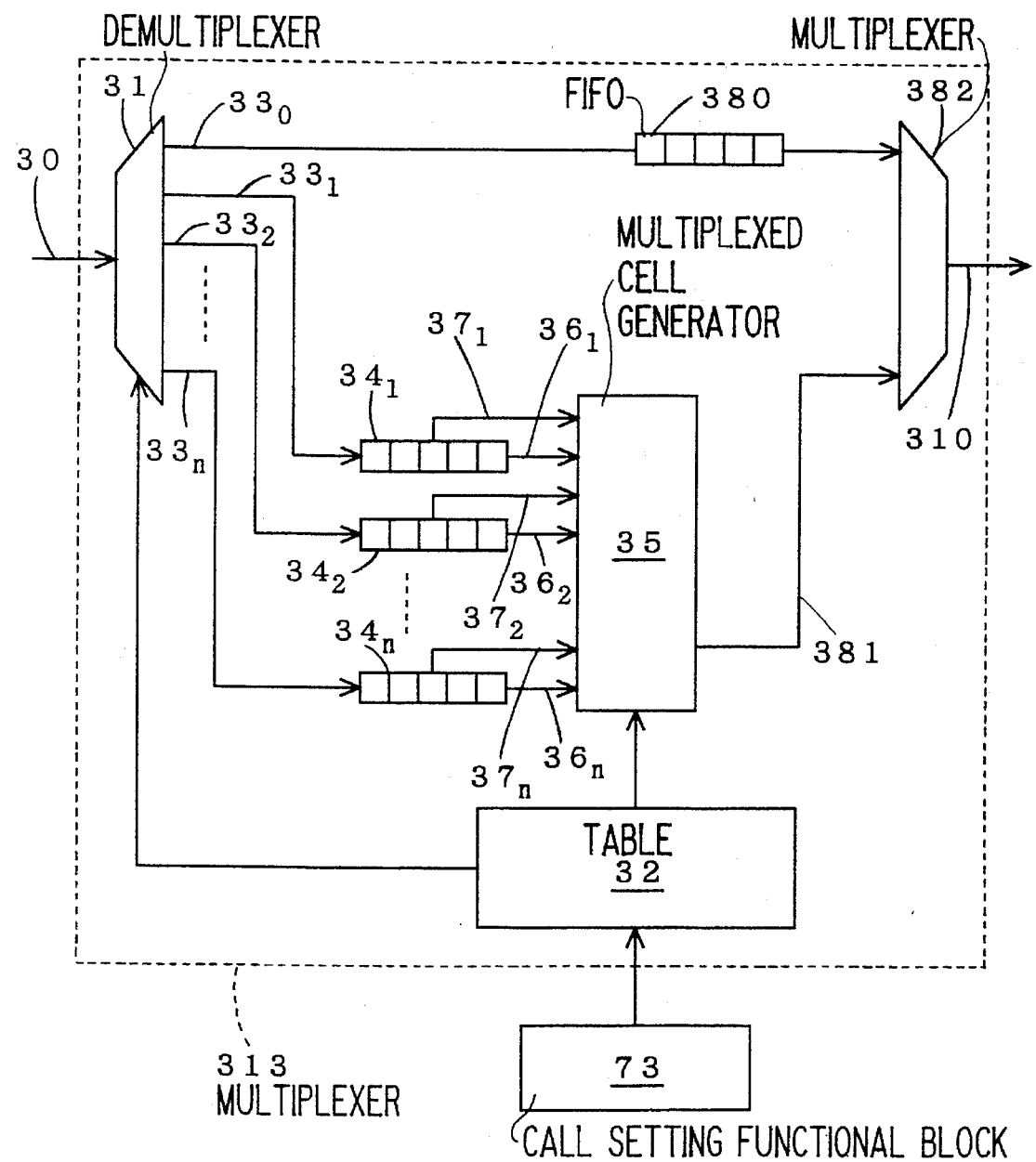
FIG. 14 is a block diagram showing a multiplexer according to a ninth embodiment of the present invention.

A device according to the ninth embodiment of the present invention is now described. FIG. 14 is a block diagram showing the internal structure of a multiplexer 313 according to this embodiment. This multiplexer 313 is characteristically different from the multiplexer 312 in a point that the FIFO 38 is removed and an FIFO 380 is interposed on a line $33_0$ in place thereof. A multiplexed cell which is transmitted from a multiplexed cell generator 35 is directly inputted in a multiplexer 382 through a line 381. On the other hand, demultiplexed cells which are transmitted from a demultiplexer 31 to the line $33_0$ are temporarily stored in the FIFO 380.

The demultiplexed cells which are stored in the FIFO 380 are inserted in vacant cells which are detected by the multiplexer 382 on the line 381, and transmitted to an outgoing line 310. Therefore, no delay fluctuation of transmitted voice signals is caused in the multiplexer 313.

Also in the demultiplexer 59 (FIG. 6), the FIFO 56 may be removed so that another FIFO is interposed on the line $53_0$. A similar effect can be attained also in this case.

<10. Tenth Embodiment>

Figure 15:
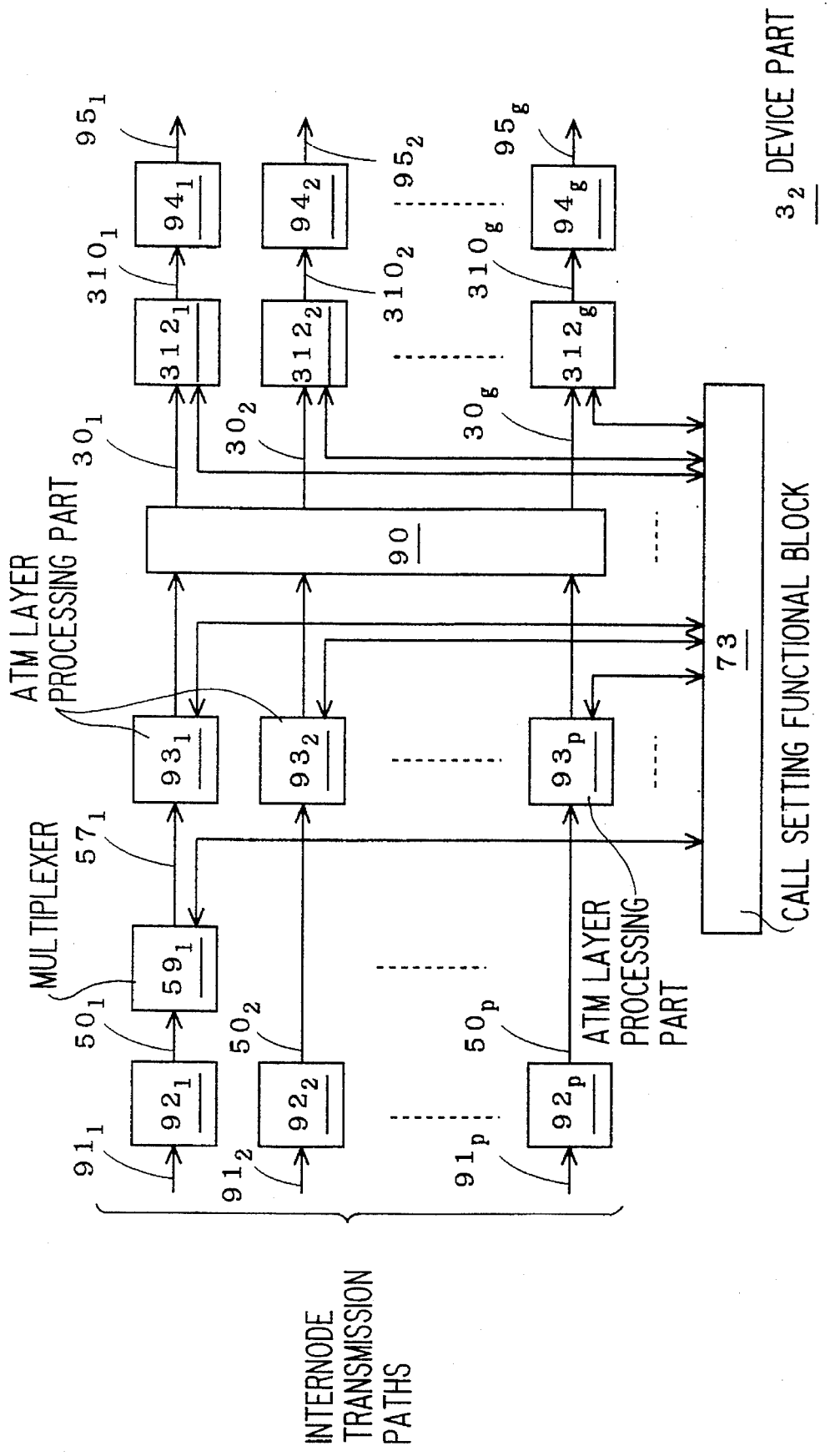
FIG. 15 is a block diagram showing a switching device according to a tenth embodiment of the present invention.
Figure 16:
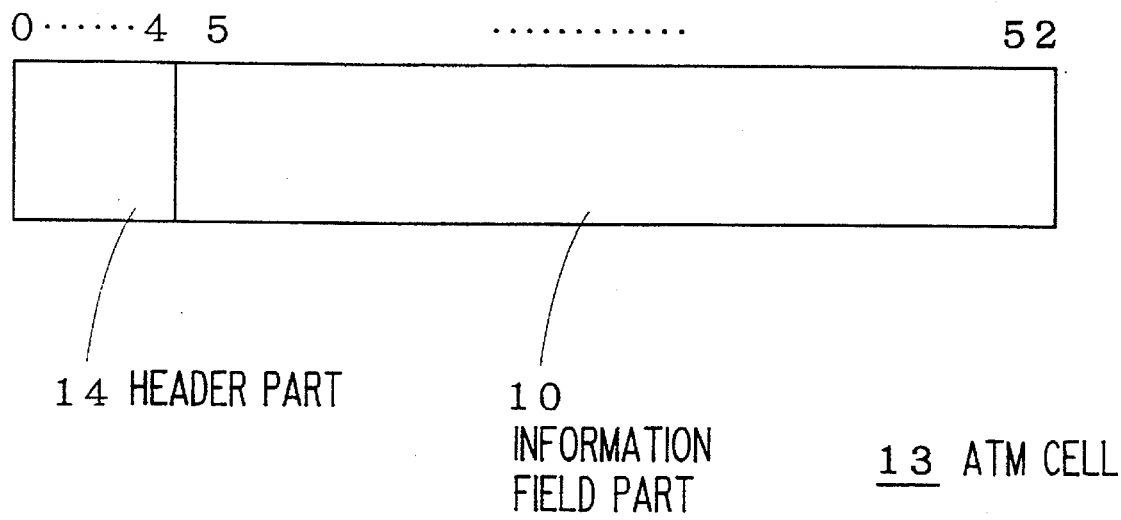
FIG. 16 is a structural diagram showing the structure of an ATM cell.

A device according to the tenth embodiment of the present invention is now described. FIG. 15 is an internal block diagram showing another exemplary structure of a device part provided in a switching unit which is interposed between internode transmission paths for relaying unidirectionally transmitted signals. This device part $3_2$ is characteristically different from the device part $3_1$ according to the fourth embodiment in a point that a demultiplexer 59 is interposed only in a part of lines $50_1$ to $50_p$ on input sides of ATM layer processing parts $93_1$ to $93_p$. FIG. 15 illustrates such an example that the demultiplexer 59 is interposed only on the line $50_1$.

This device part $3_2$ is effectively utilized when a transmission path for transmitting a multiplexed voice signal is limited to a part among incoming line side internode transmission paths $91_1$ to $91_p$.

While the invention has been shown and described in detail, the foregoing description is in all aspects illustrative and not restrictive. It is therefore understood that numerous modifications and variations can be devised without departing from the scope of the invention.

What is claimed is:

1. A multiplexer in an asynchronous transfer mode network for multiplexing a plurality of demultiplexed virtual channels transmitting voice signals to a multiplexed virtual channel, said multiplexer comprising:

(a) a table capable of registering correspondences between virtual channel identifiers of said plurality of demultiplexed virtual channels transmitting voice signals among virtual channels being set on an incoming line and positions in an information field of a multiplexed cell belonging to said multiplexed virtual channel among virtual channels being set on an outgoing line; and (b) cell multiplexing means for receiving demultiplexed cells being inputted from said incoming line and storing signals being stored in information fields of said demultiplexed cells belonging to a plurality of said demultiplexed virtual channels in prescribed positions of said information field of said multiplexed cell on the basis of said correspondence being register in said table for transmitting said multiplexed cell to said outgoing line.

2. The multiplexer in accordance with claim 1, wherein said cell multiplexing means comprises:

(b-1) a first line,
    (b-2) a plurality of second lines, and
    (b-3) a third line, said table being capable of further registering correspondences between said virtual channel identifiers of said plurality of demultiplexed virtual channels transmitting voice signals and said second lines, said cell multiplexing means further comprising:

(b-4) distribution means receiving cells from said incoming line and comparing virtual channel identifiers of said cells with registered contents in said table for transmitting said cells to said first line when said cells belong to none of said demultiplexed virtual channels transmitting voice signals while distributing signals being stored in said information fields of said demultiplexed cells to any ones of said second lines on the basis of said correspondences being registered in said table when said cells are demultiplexed cells belonging to said demultiplexed virtual channels transmitting voice signals, (b-5) multiplexed cell generation means for storing said signals being distributed to said plurality of second lines in prescribed positions in said information field of said multiplexed cell on the basis of said correspondences being registered in said table and transmitting said multiplexed cell to said third line, and (b-6) integration means for transmitting said cells being transmitted to said first line and said multiplexed cell being transmitted to said third line to said outgoing line.

3. The multiplexer in accordance with claim 2, wherein said cell multiplexing means further comprises:

(b-7) FIFO memory means being interposed in each of said plurality of second lines, said multiplexed cell generation means successively reading said signals being stored in said FIFO memory means every constant period.

23

4. The multiplexer in accordance with claim 3, wherein a display field is provided in a prescribed position of said information field of said multiplexed cell, said multiplexed cell generation means further comprises:
(b-6-1) means for storing a signal expressing the fact of occurrence of an overflow or an underrun in said FIFO memory means, and a signal specifying one of said second lines causing said fact in said display field.

5. The multiplexer in accordance with claim 2, wherein said cell multiplexing means further comprises:
(b-8) FIFO memory means being interposed in said third line, said integration means transmitting said cells being transmitted on said first line to said outgoing line, while reading said multiplexed cell being stored in said FIFO memory means in coincidence with timing causing a vacant cell in said first line as well as inserting said multiplexed cell in said vacant cell and transmitting the same to said outgoing line.

6. The multiplexer in accordance with claim 2, further comprising:
(b-9) FIFO memory means being interposed in said first line,
said integration means transmitting said multiplexed cell being transmitted on said third line to said outgoing line, while reading said cell being stored in said FIFO memory means in coincidence with timing causing a vacant cell in said third line as well as inserting said cell from FIFO memory in said vacant cell and transmitting the same to said outgoing line.

7. A demultiplexer in an asynchronous transfer mode network for demultiplexing a multiplexed virtual channel transmitting voice signals to a plurality of demultiplexed virtual channels, said demultiplexer comprising:
(a) a table capable of registering correspondences between virtual channel identifiers of said plurality of demultiplexed virtual channels transmitting voice signals being set on an outgoing line and positions in an information field of a multiplexed cell belonging to said multiplexed virtual channel transmitting voice signals among virtual channels being set on an incoming line; and
(b) cell demultiplexing means for receiving said multiplexed cell being inputted from said incoming line and distributing signals in an information field of received said multiplexed cell to information fields of a plurality of demultiplexed cells respectively belonging to said plurality of demultiplexed virtual channels on the basis of said correspondences being registered in said table for transmitting said plurality of demultiplexed virtual channels to said outgoing line.

8. The demultiplexer in accordance with claim 7, wherein said cell demultiplexing means comprises:
(b-1) a first line,
(b-2) a plurality of second lines, and
(b-3) a third line,
said table being capable of further registering correspondences between a virtual channel identifier of said multiplexed virtual channel transmitting voice signals and said second lines,
said cell demultiplexing means further comprising:
(b-4) distribution means receiving a cell from said incoming line and comparing a virtual channel identifier of said cell with registered contents in said table for transmitting said cell to said first line when said cell belongs to no said multiplexed virtual channel transmitting voice signals while distributing said information field of said multiplexed cell to any ones of said second lines on the basis of said correspondences being registered in said table when said cell is a multiplexed cell belonging to a multiplexed virtual channel transmitting voice signals,
(b-5) demultiplexed cell generation means for storing signals in respective said information fields being distributed to said plurality of second lines to said information fields of said plurality of demultiplexed cells on the basis of said correspondences being registered in said table and transmitting said demultiplexed cells to said third line, and
(b-6) integration means for transmitting said cell being transmitted to said first line and said demultiplexed cells being transmitted to said third line to said outgoing line.

9. The demultiplexer in accordance with claim 8, wherein said cell demultiplexing means further comprises:
(b-8) FIFO memory means being interposed in said third line,
said integration means transmitting said cell being transmitted on said first line to said outgoing line, while reading said demultiplexed cells being stored in said FIFO memory means in coincidence with timing causing a vacant cell in said first line as well as inserting said demultiplexed cells in said vacant cell and transmitting the same to said outgoing line.

10. The demultiplexer in accordance with claim 8, further comprising:
(b-9) FIFO memory means being interposed in said first line,
said integration means transmitting said demultiplexed cells being transmitted on said third line to said outgoing line, while reading said cell being stored in said FIFO memory means in coincidence with timing causing a vacant cell in said third line as well as inserting said cell from FIFO memory in said vacant cell and transmitting the same to said outgoing line.

11. A switching device for relaying a plurality of subscriber's lines and a plurality of internode transmission paths in an asynchronous transfer mode network, said switching device comprising:
(a) switching means for switching cells being transmitted from said plurality of subscriber's lines at virtual channel levels and outputting said cells to any ones of output lines of the same number as said internode transmission paths; and
(b) a plurality of multiplexers, each employing each of said output lines of said switching means as an incoming line thereof while employing each of said internode transmission paths as an outgoing line thereof respectively,
each of said plurality of multiplexers being a multiplexer in said asynchronous transfer mode network for multiplexing a plurality of demultiplexed virtual channels transmitting voice signals to a multiplexed virtual channel,
each of said plurality of multiplexers comprising:
(b-1) a table capable of registering correspondences between virtual channel identifiers of said plurality of demultiplexed virtual channels transmitting voice signals among virtual channels being set on said incoming line and positions in an information field of a multiplexed cell belonging to said multiplexed virtual channel being set on said outgoing line, and (b-2) cell multiplexing means for receiving demultiplexed cells being inputted from said incoming line and storing signals in information fields of said demultiplexed cells belonging to a plurality of said demultiplexed virtual channels in prescribed positions of said information field of said multiplexed cell on the basis of said correspondences being registered in said table for transmitting said multiplexed cell to said outgoing line.

12. A switching device for relaying a plurality of subscriber's lines and a plurality of internode transmission paths in an asynchronous transfer mode network, said switching device comprising:

(a) a plurality of demultiplexers, each having an incoming line being connected to each of said internode transmission paths respectively, each of said plurality of demultiplexers being a demultiplexer in said asynchronous transfer mode network for demultiplexing a multiplexed virtual channel transmitting voice signals to a plurality of demultiplexed virtual channels, each of said plurality of demultiplexers comprising:

(a-1) a table capable of registering correspondences between virtual channel identifiers of said plurality of demultiplexed virtual channels transmitting voice signals being set on an outgoing line and positions in an information field of a multiplexed cell belonging to said multiplexed virtual channel transmitting voice signals among virtual channels being set on said incoming line, and (a-2) cell demultiplexing means for receiving said multiplexed cell being inputted from said incoming line and distributing signals in said information field of received said multiplexed cell to information fields of a plurality of demultiplexed cells respectively belonging to said plurality of demultiplexed virtual channels on the basis of said correspondences being registered in said table for transmitting said plurality of demultiplexed virtual channels to said outgoing line, and said switching device further comprising:

(b) switching means for switching cells outputted on said outgoing line of each of said plurality of demultiplexers at virtual channel levels and outputting said cells to any ones of said plurality of subscribers' lines.

13. A switching device for relaying a plurality of subscriber's lines and a plurality of internode transmission paths in an asynchronous transfer mode network, said switching device comprising:

(a) first switching means for switching cells being transmitted from said plurality of subscriber's lines at virtual channel levels and outputting said cells to any ones of output lines of the same number as said internode transmission paths; and (b) a plurality of multiplexers, each employing each of said output lines of said switching means as first incoming line thereof while employing each of said internode transmission paths as first outgoing lines thereof respectively, each of said plurality of multiplexers being a multiplexer in said asynchronous transfer mode network for multiplexing a plurality of demultiplexed virtual channels transmitting voice signals to a multiplexed virtual channel, each of said plurality of multiplexers comprising:

(b-1) a table capable of registering correspondences between virtual channel identifiers of said plurality of demultiplexed virtual channels transmitting voice signals among virtual channels being set on said first incoming line and positions in an information field of a multiplexed cell belonging to said multiplexed virtual channel being set on said first outgoing line, and (b-2) cell multiplexing means for receiving demultiplexed cells being inputted from said first incoming line and storing signals in information fields of said demultiplexed cells belonging to a plurality of said demultiplexed virtual channels in prescribed positions of said information field of said multiplexed cell on the basis of said correspondences being registered in said table for transmitting said multiplexed cell to said first outgoing line, said switching device further comprising:

(d) a plurality of demultiplexers, each having second incoming line being connected to each of said internode transmission paths respectively, each of said plurality of demultiplexers being a demultiplexer in said asynchronous transfer mode network for demultiplexing a multiplexed virtual channel transmitting voice signals to a plurality of demultiplexed virtual channels, each of said plurality of demultiplexers comprising:

(d-1) a table capable of registering correspondences between virtual channel identifiers of said plurality of demultiplexed virtual channels being set on a second outgoing line and positions in an information field of a multiplexed cell belonging to said multiplexed virtual channel transmitting voice signals among virtual channels being set on said second incoming line, and (d-2) cell demultiplexing means for receiving said multiplexed cell being inputted from said second incoming line and distributing signals in said information field of received said multiplexed cell to information fields of a plurality of demultiplexed cells respectively belonging to said plurality of demultiplexed virtual channels on the basis of said correspondences being registered in said table for transmitting said plurality of demultiplexed cells to said second outgoing line, said switching device further comprising:

(e) second switching means for switching said cells being outputted on said second outgoing line of each of said plurality of demultiplexers at virtual channel levels and outputting said cells to any ones of said plurality of subscriber's lines.

14. A switching device for relaying a plurality of first internode transmission paths and a plurality of second internode transmission paths in an asynchronous transfer mode network, said switching device comprising:

(a) a plurality of demultiplexers, each having first incoming line being connected to each of said first internode transmission paths respectively, each of said plurality of demultiplexers being a demultiplexer in said asynchronous transfer mode network for demultiplexing a multiplexed virtual channel transmitting voice signals to a plurality of demultiplexed virtual channels, each of said plurality of demultiplexers comprising:

(a-1) a table capable of registering correspondences between virtual channel identifiers of said plurality of demultiplexed virtual channels being set on a first
outgoing line and positions in an information field of
a multiplexed cell belonging to said multiplexed
virtual channel transmitting voice signals among
virtual channels being set on said first incoming line,
and (a-2) cell demultiplexing means for receiving said
multiplexed cell being inputted from said first
incoming line and distributing signals in said information field of received said multiplexed cell to
information fields of a plurality of demultiplexed
cells respectively belonging to said plurality of
demultiplexed cells on the basis of said correspondences being registered in said table and transmitting
said plurality of demultiplexed cells to said first
outgoing line, said switching device further comprising:

(b) switching means for switching cells being outputted
on said first outgoing line of each of said demultiplexers at virtual channel levels and outputting said
cells to any ones of output lines of the same number
as said second internode transmission paths, and (c) a plurality of multiplexers, each employing each of
said output lines of said switching means as second
incoming line thereof while employing each of said
second internode transmission paths as second outgoing line thereof respectively, each of said plurality of multiplexers being a multiplexer
in said asynchronous transfer mode network for multiplexing a plurality of demultiplexed virtual channels
transmitting voice signals to a multiplexed virtual channel, each of said plurality of multiplexers comprising:

(c-1) a table capable of registering correspondences
between virtual channel identifiers of said plurality
of demultiplexed virtual channels transmitting voice
signals among virtual channels being set on said
second incoming line and positions in an information
field of a multiplexed cell belonging to said multiplexed virtual channel being set on said second
outgoing line, and (c-2) cell multiplexing means for receiving a plurality
of demultiplexed cells respectively belonging to said
plurality of demultiplexed virtual channels being
inputted from said second incoming line and storing
signals in information fields of said demultiplexed
cells belonging to a plurality of said demultiplexed
virtual channels in prescribed positions of said information field of said multiplexed cell on the basis of
said correspondences being registered in said table
and transmitting said multiplexed cell to said second
outgoing line.

15. A switching device for relaying a plurality of first
internode transmission paths and a plurality of second
internode transmission paths in an asynchronous transfer
mode network, said switching device comprising:

(a) a plurality of first demultiplexers, each having first
incoming line being connected to each of said first
internode transmission paths respectively, each of said plurality of first demultiplexers being a
demultiplexer in said asynchronous transfer mode network for demultiplexing a multiplexed virtual channel
transmitting voice signals to a plurality of demultiplexed virtual channels, each of said plurality of first demultiplexers comprising:

(a-1) a table capable of registering correspondences
between virtual channel identifiers of said plurality
of demultiplexed virtual channels being set on a first
outgoing line and positions in an information field of
a multiplexed cell belonging to said multiplexed
virtual channel transmitting voice signals among
virtual channels being set on said first incoming line,
and (a-2) cell demultiplexing means for receiving said
multiplexed cell being inputted from said first
incoming line and distributing signals in an information field of received said multiplexed cell to
information fields of a plurality of demultiplexed
cells respectively belonging to said plurality of
demultiplexed virtual channels on the basis of said
correspondences being registered in said table for
transmitting said plurality of demultiplexed cells to
said first outgoing line, said switching device further comprising:

(b) first switching means for switching cells being
outputted on said first outgoing line of each of said
first demultiplexers at virtual channel levels and
outputting said cells to any ones of first output lines
of the same number as said second internode transmission paths, and (c) a plurality of first multiplexers, each employing
each of said first output lines of said first switching
means as second incoming line thereof while
employing each of said second internode transmission paths as second outgoing line thereof respectively, each of said plurality of first multiplexers being a multiplexer in said asynchronous transfer mode network for
multiplexing a plurality of demultiplexed virtual channels transmitting voice signals to a multiplexed virtual
channel, each of said plurality of first multiplexers comprising:

(c-1) a table capable of registering correspondences
between virtual channel identifiers of said plurality
of demultiplexed virtual channels transmitting voice
signals among virtual channels being set on said
second incoming line and positions in an information
field of a multiplexed cell belonging to said multiplexed virtual channel being set on said second
outgoing line, and (c-2) cell multiplexing means for receiving demultiplexed cells being inputted from said second incoming line and storing signals in information fields of
said demultiplexed cells belonging to a plurality of
said demultiplexed virtual channels in prescribed
positions of said information field of said multiplexed cell on the basis of said correspondences
being registered in said table for transmitting said
multiplexed cell to said second outgoing line, said switching device further comprising:

(d) a plurality of second demultiplexers, each having
third incoming line being connected to each of said
second internode transmission paths respectively, each of said plurality of second demultiplexers being a
demultiplexer in said asynchronous transfer mode network for demultiplexing a multiplexed virtual channel
transmitting voice signals to a plurality of demultiplexed virtual channels, each of said plurality of second demultiplexers comprising:

(d-1) a table capable of registering correspondences
between virtual channel identifiers of said plurality
of demultiplexed virtual channels being set on a third outgoing line and positions in an information field of a multiplexed cell belonging to said multiplexed virtual channel transmitting voice signals among virtual channels being set on said third incoming line, and (d-2) cell demultiplexing means for receiving said multiplexed cell being inputted from said third incoming line and distributing signals in an information field of received said multiplexed cell to information fields of a plurality of demultiplexed cells respectively belonging to said plurality of demultiplexed virtual channels on the basis of said correspondences being registered in said table for transmitting said plurality of demultiplexed cells to said third outgoing line, said switching device further comprising:

(e) second switching means for switching cells being outputted on said third outgoing line of each of said plurality of second demultiplexers at virtual channel levels and outputting said cells to any ones of second output lines of the same number as said first internode transmission paths, and (f) a plurality of second multiplexers, each employing each of said second output lines of said second switching means as fourth incoming line thereof while employing each of said first internode transmission paths as fourth outgoing line thereof respectively, each of said plurality of second multiplexers being a multiplexer in said asynchronous transfer mode network for multiplexing a plurality of demultiplexed virtual channels transmitting voice signals to a multiplexed virtual channel, each of said plurality of second multiplexers comprising:

(f-1) a table capable of registering correspondences between virtual channel identifiers of said plurality of demultiplexed virtual channels transmitting voice signals among virtual channels being set on said fourth incoming line and positions in an information field of a multiplexed cell belonging to said multiplexed virtual channel being set on said fourth outgoing line, and (f-2) cell multiplexing means for receiving said demultiplexed cells being inputted from said fourth incoming line and storing signals in information fields of said demultiplexed cells belonging to a plurality of said demultiplexed virtual channels in prescribed positions of said information field of said multiplexed cell on the basis of said correspondences being registered in said table for transmitting said multiplexed cell to said fourth outgoing line.

16. A network adapter for relaying a synchronous mode transmission path in a synchronous transfer mode network and an asynchronous mode transmission path in an asynchronous transfer mode path, said network adapter comprising:

(a) interface means for demultiplexing a time-division multiplexed signal being transmitted from said synchronous mode transmission path and transmitting the same to a plurality of first output lines;

(b) cell adaptation means for setting virtual channels being varied with said first output lines and storing demultiplexed time-division signals in information fields of cells belonging to said virtual channels, thereby carrying out cellularization to create cellularized signals;

(c) integration means for transmitting cellularized signals to a second output line; and (d) a multiplexer having said second output line as an incoming line and said asynchronous mode transmission path as an outgoing line, said multiplexer being a multiplexer in said asynchronous transfer mode network for multiplexing a plurality of demultiplexed virtual channels transmitting voice signals to a multiplexed virtual channel, said multiplexer comprising:

(d-1) a table capable of registering correspondences between virtual channel identifiers of said plurality of demultiplexed virtual channels transmitting voice signals among virtual channels being set on said incoming line and positions in an information field of a multiplexed cell belonging to said multiplexed virtual channel being set on said outgoing line, and (d-2) cell multiplexing means for receiving demultiplexed cells being inputted from said incoming line and storing signals in information fields of said demultiplexed cells belonging to a plurality of said demultiplexed virtual channels in prescribed positions of said information field of said multiplexed cell on the basis of said correspondences being registered in said table for transmitting said multiplexed cell to said outgoing line.

17. A network adapter for relaying a synchronous mode transmission path in a synchronous transfer mode network and an asynchronous mode transmission path in an asynchronous transfer mode path, said network adapter comprising:

(a) a demultiplexer having an incoming line being connected to said asynchronous mode transmission path, said demultiplexer being a demultiplexer in said asynchronous transfer mode network for demultiplexing a multiplexed virtual channel transmitting voice signals to a plurality of demultiplexed virtual channels, said demultiplexer comprising:

(a-1) a table capable of registering correspondences between virtual channel identifiers of said plurality of demultiplexed virtual channels transmitting voice signals being set on an outgoing line and positions in an information field of a multiplexed cell belonging to said multiplexed virtual channel among virtual channels being set on said incoming line; and (a-2) cell demultiplexing means for receiving said multiplexed cell being inputted from said incoming line and distributing a signal in an information field of received said multiplexed cell to information fields of a plurality of demultiplexed cells respectively belonging to said plurality of demultiplexed virtual channels on the basis of said correspondences being registered in said table for transmitting said plurality of demultiplexed cells to said outgoing line, said network adapter further comprising:

(b) distribution means for distributing cells being outputted on said outgoing line of said demultiplexer to output lines being varied with virtual channels and transmitting the same, (c) adaptation means for taking out said signals from said information fields of said cells being transmitted to said output lines of said distribution means, and (d) interface means for time-division multiplexing said signals as being taken out for transmitting the same to said synchronous mode transmission path.

18. A network adapter for relaying a synchronous mode transmission path in a synchronous transfer mode network and an asynchronous mode transmission path in an asynchronous transfer mode path, said network adapter comprising:

(a) first interface means for demultiplexing a time-division multiplexed signal being transmitted from said synchronous mode transmission path and transmitting the same to a plurality of first output lines;

(b) first adaptation means for setting virtual channels being varied with said first output lines and storing demultiplexed time-division signals in information fields of cells belonging to said virtual channels, thereby carrying out cellularization;

(c) integration means for transmitting cellularized signals to a second output line; and (d) a first multiplexer having said second output line as a first incoming line and said asynchronous mode transmission path as a first outgoing line, said first multiplexer being a multiplexer in said asynchronous transfer mode network for multiplexing a plurality of demultiplexed virtual channels transmitting voice signals to a multiplexed virtual channel, said multiplexer comprising:

(d-1) a table capable of registering correspondences between virtual channel identifiers of said plurality of demultiplexed virtual channels transmitting voice signals among virtual channels being set on said first incoming line and positions in an information field of a multiplexed cell belonging to said multiplexed virtual channel being set on said first outgoing line, and (d-2) cell multiplexing means for receiving demultiplexed cells being inputted from said first incoming line and storing signals in information fields of said demultiplexed cells belonging to a plurality of said demultiplexed virtual channels in prescribed positions of said information field of said multiplexed cell on the basis of said correspondences being registered in said table for transmitting said multiplexed cell to said first outgoing line, said network adapter further comprising:

(e) a demultiplexer having a second incoming line being connected to said asynchronous mode transmission path, said demultiplexer being a demultiplexer in said asynchronous transfer mode network for demultiplexing a multiplexed virtual channel transmitting voice signals to a plurality of demultiplexed virtual channels, said demultiplexer comprising:

(e-1) a table capable of registering correspondences between virtual channel identifiers of said plurality of demultiplexed virtual channels transmitting voice signals being set on said demultiplexed virtual channels and positions in an information field of a multiplexed cell belonging to said multiplexed virtual channel among virtual channels being set on said second incoming line; and (e-2) cell demultiplexing means for receiving said multiplexed cell being inputted from said second incoming line and distributing a signal in an information field of received said multiplexed cell to information fields of said demultiplexed virtual channels on the basis of said correspondences being registered in said table for transmitting said multiplexed cell to said demultiplexed virtual channels, said network adapter further comprising:

(f) distribution means for distributing cells being outputted on said second outgoing line of said demultiplexer to third output lines being varied with virtual channels and transmitting the same, (g) second adaptation means for taking out said signals in said information fields of said cells being transmitted to said third output lines of said distribution means, and (h) second interface means for time-division multiplexing said signals as being taken out for transmitting the same to said synchronous mode transmission path.

* * * * *